(12) United States Patent
Lowe et al.

(10) Patent No.: US 8,730,245 B2
(45) Date of Patent: May 20, 2014

(54) DEFINING AN ANIMATION OF A VIRTUAL OBJECT WITHIN A VIRTUAL WORLD

(75) Inventors: Thomas Lowe, Oxford (GB); Danny Chapman, Oxford (GB); Timothy Daoust, Oxford (GB); James Brewster, Oxford (GB)

(73) Assignee: NaturalMotion Ltd., Oxford (GB)

( * ) Notice: Subject to any disclaimer, the term of this patent is extended or adjusted under 35 U.S.C. 154(b) by 1197 days.

(21) Appl. No.: 12/544,395

(22) Filed: Aug. 20, 2009

(65) Prior Publication Data

US 2010/0134501 A1   Jun. 3, 2010

Related U.S. Application Data

(60) Provisional application No. 61/118,742, filed on Dec. 1, 2008.

(51) Int. Cl.
*G06T 13/00* (2011.01)

(52) U.S. Cl.
USPC .......................................... 345/473; 345/475

(58) Field of Classification Search
CPC ...... G06T 13/00; G06T 13/40; G06T 2213/12
USPC ........... 715/700, 747, 757; 717/113; 345/473, 345/474, 475
See application file for complete search history.

(56) References Cited

U.S. PATENT DOCUMENTS

| | | | | |
|---|---|---|---|---|
| 6,208,357 B1 * | 3/2001 | Koga et al. | | 345/473 |
| 7,720,656 B2 * | 5/2010 | Raghavan et al. | | 703/6 |
| 8,281,297 B2 * | 10/2012 | Dasu et al. | | 717/161 |

OTHER PUBLICATIONS

National Instruments "LabVIEW user manual", 2003.*

* cited by examiner

*Primary Examiner* — Maurice L McDowell, Jr.
(74) *Attorney, Agent, or Firm* — Westman, Champlin & Koehler, P.A.

(57) ABSTRACT

In a method of defining an animation of a virtual object, during which values for attributes of the virtual object are updated at each of a series of time points, a user specifies a structure representing the update that includes a plurality of items and one or more connections between respective items. Each item represents a respective operation. Each connection represents that data output by the operation represented by one item is input to the operation represented by the connected item. The user specifies that the structure comprises one or more items in a predetermined category associated with a predetermined process that may be executed at most a predetermined number of times at each time point. An item belongs to the predetermined category if performing the respective operation represented by that item requires execution of the predetermined process. One or more rules are applied.

45 Claims, 28 Drawing Sheets

LEVEL 1 (TOP LEVEL)

LEVEL 2 (MIDDLE LEVEL)

LEVEL 3 (LOWER LEVEL)

DEFINING AN ANIMATION OF A VIRTUAL OBJECT WITHIN A VIRTUAL WORLD

CROSS-REFERENCE TO RELATED APPLICATION

The present application is based on and claims the benefit of U.S. provisional patent application Ser. No. 61/118,742, filed Dec. 1, 2008, the content of which is hereby incorporated by reference in its entirety.

FIELD OF THE INVENTION

The present invention relates to a method, apparatus, and computer readable medium storing a computer program, for defining an animation of a virtual object within a virtual world.

BACKGROUND OF THE INVENTION

There are many known ways to author an animation of a virtual object within a virtual world. One example is the graph-based approach in which the animation of an object is depicted as a user-defined graph of interconnected nodes, with each node representing a particular computational process involved in the animation, the ordering and dependencies of the nodes as represented by the graph representing the ordering and dependencies of the various computational processes. However, such a graph-based approach has so far proved somewhat limited when the user would like to introduce more complex computational processes, such as the use of a "physics engine" to simulate the laws of physics acting on the virtual object. For example, to date, a physics engine has been used in animations (a) as a completely independent visual effect, such as adding explosions, flames and fluids that do not interact with the rest of the virtual world; (b) adding loosely constrained visual effects such as cloth and hair simulation that are 'attached' to the virtual world but do not interact with it; and (c) post-process dynamics.

Post-process dynamics is a process that takes the output of an animation engine that has just processed a graph-definition of an animation in order to update an animation of an object. The post-process dynamics process "physicalises" the animation that it receives via the application of a physics engine. Two example uses of post-process dynamics are "hard keyframing" and "ragdoll" processing. "Ragdoll" post-process dynamics involves the physics engine receiving current animation data representing a virtual object from the animation engine, and then applying the simulated laws of physics to the virtual object to allow the object to move unconstrained under the simulated laws of physics. This can be used to simulate deaths of animated characters—the character collapses according to gravity and collision. "Hard keyframing" involves the physics engine receiving current animation data representing a virtual object from the animation engine and forcing the object to follow the animation path/trajectory of the animation that the animation engine outputs regardless of interaction (e.g. collision) with other objects in the virtual world—the virtual object is able to collide with, and impart momentum to, other objects in the virtual world without itself being deflected. As suggested by its name, the post process dynamics is a process that is applied to an animation after an animation processor has processed an animation description (such as a graph-definition).

Post-process dynamics has two main disadvantages. Firstly, the output of the physics engine determines the state of the virtual world—the physics engine and its simulated laws of physics determine how the virtual world will look when it is drawn to the computer screen. This is due to the fact that the post process dynamics is applied to an animation after an animation engine has processed the graph-definition for the animation This might lead to a less realistic and aesthetically pleasing animation and so animation designers may be, understandably, reluctant to make use (or at least extensive use) of post-process dynamics. Secondly, incorporating the use of a physics engine into a graph-based animation editor is non-intuitive. For example, graphs are edited/designed separately on an object-by-object basis, whereas a physics engine operates on all the objects in the virtual world simultaneously.

One possible approach would be to represent the use of a physics engine as a "physics node" of the graph but restrict it to appear only as a part of the graph that calculates final output data to represent the output animation. However, this would limit the graphs and would prevent, for example, the user defining post-physics animation-processing such as inverse-kinematics touch-ups (e.g. moving hands or fingers into contact with objects) or facial animation. Another approach might be to consider allowing the physics node representing the physics engine to be placed anywhere in the graph. However, as the physics engine can only be executed once per update of the virtual world, this would involve only being allowed to place such a physics node once in the graph. The user may, however, wish to author a state machine in a graph which includes a ragdolling character transitioning into a hard-keyframed animation—this would require the use of multiple physics nodes.

It would therefore be desirable to be able to allow the user of an animation editor or animation design tool to design an animation of an object in a more flexible manner to allow the incorporation of "physics processing" in an easier to use and more flexible manner, to thereby allow the user to create more interesting, realistic and complex animations.

The use of a physics engine is just one example difficulty with the graph-based approach. Whilst graph-based animation design provides the user with an intuitive mechanism for designing animations of objects, it would be desirable to be able to provide improvements to such graph-based design to make the authoring process more intuitive whilst also making it possible to create more interesting and complex animations (e.g. by being able to flexibly and intuitively incorporate such functionality as a physics engine).

SUMMARY OF THE INVENTION

According to a first aspect of the invention, there is provided a method of defining an animation of a virtual object within a virtual world, wherein the animation comprises performing, at each of a series of time points, an update that updates values for object attributes of the virtual object, the method comprising: allowing a user to define the update by specifying, on a user interface, a structure representing the update, wherein the structure comprises a plurality of items and one or more connections between respective items, wherein each item represents a respective operation that may be performed when performing the update and wherein a connection between two items represents that data output by the operation represented by one of those two items is input to the operation represented by the other of those two items; allowing the user to specify that the structure comprises one or more items in a predetermined category, the predetermined category being associated with a predetermined process such that an item belongs to the predetermined category if performing the respective operation represented by that item requires execution of the predetermined process, wherein said predetermined process may be executed at most a predetermined number of times at each time point (or each time the update is performed); and applying one or more rules that (a) restrict how the user may specify the structure to ensure that performing the defined update does not require execution of the predetermined process more than the predetermined number of times, (b) do not require the user to specify that an item in the predetermined category is at a particular location within the structure relative to other items and (c) do not require the user to explicitly specify which operations need to be performed before execution of the predetermined process when performing the update nor which operations need to be performed after execution of the predetermined process when performing the update.

The one or more rules may restrict how the user may specify the structure to ensure that, when the predetermined process is executed, the predetermined process receives as input data at most one value for each object attribute.

The one or more rules may allow the user to specify the structure such that the data output by the operation represented by a first item may comprise a first value for a particular object attribute whilst the data output by the operation represented by a second item may comprise a second value, different from the first value, for that particular object attribute.

The one or more rules may restrict how the user may specify the structure to ensure that, when the predetermined process is executed, any data upon which the predetermined process operates is self-consistent.

The one or more rules may restrict how the user may specify the structure to ensure that, when the predetermined process is executed, the predetermined process does not receive as inputs a plurality of data values that represent a single data entity on which the predetermined process is to operate.

The structure may be a hierarchical state machine having one or more states, the or each state comprising one or more of the items of the structure; and the one or more rules may specify that the or each state may comprise at most one item in the predetermined category.

The structure may be a hierarchical state machine having one or more states, the or each state comprising one or more of the items of the structure; and the one or more rules may specify that a state may only comprise a plurality of items in the predetermined category provided that the respective operations represented by those items in the predetermined category do not each operate on data comprising a respective value for a common object attribute.

The structure may comprise a state machine having a plurality of states, each state comprising one or more of the items of the structure, wherein a first state and a second state both comprise one or more respective items in the predetermined category; and the method may then comprise specifying that, for a transition from the first state to the second state during which both the first state and the second state are to process and output data, execution of the predetermined process by the respective operations represented by the one or more items in the predetermined category of the first state or of the second state is replaced by execution of an alternative process not involving the predetermined process. The alternative process may be an approximation of the predetermined process.

The structure may be a hierarchical state machine having one or more states, the or each state comprising one or more of the items of the structure; and the one or more rules may restrict how the user may specify the structure to ensure that, for each object attribute, only one state that operates on that object attribute may be active when performing the update.

The one or more rules may specify that when an item is arranged to receive, from each of a plurality of items in the structure, data comprising a respective value for a particular object attribute, then that plurality of items may comprise at most one item in the predetermined category.

The method may comprise the user interface allowing the user to represent a plurality of items as a single item in the structure and to reveal or hide that plurality of items in response to a request from the user. The user interface may then allow the user to specify that the structure comprises a compositor item, the compositor item being an item that (i) receives data comprising values for a plurality of object attributes; (ii) outputs data comprising values for that same plurality of object attributes; and (iii) represents a plurality of items in the structure, wherein the operation represented by one of that plurality of items operates on values for a subset of that plurality of object attributes and the operation represented by another one of that plurality of items operates on values for a different subset of that plurality of object attributes; wherein the one or more rules then specify that the plurality of items being represented by the compositor item may comprise a plurality of items in the predetermined category only if no two of these items in the predetermined category operate on a value for the same object attribute.

The predetermined process may be a simulation of the laws of physics acting on the virtual world. The predetermined process may be a game character controller process. The predetermined number of times may be one.

Specifying the structure may comprise the user placing the items within the structure depicted on the user interface such that data comprising values for object attributes are represented as being passed between operations represented by items via the connections in a predetermined direction across the user interface. Data representing time may then be represented as being passed between operations represented by items via the connections in a direction opposite to the predetermined direction.

In some embodiments, for a connection between a first item and a second item that represents that data output by the operation represented by the first item is input to the operation represented by the second item, the user interface is arranged to depict the connection such that the connection is linked to the first item at a first predetermined location relative to the first item and is linked to the second item at a second predetermined location relative to the second item. The first predetermined location may be at a right side of the first item and the second predetermined location may be at a left side of the second item. The user interface may be arranged to represent that data representing time is passed, via the connection, as an output from the operation represented by the second item to be an input to the operation represented by the first item.

The method may comprise providing a warning to the user when the user attempts to perform an action via the user interface that is contrary to the one or more rules. The method may comprise disallowing the action that is contrary to the one or more rules.

According to another aspect of the invention, there is provided an animation design apparatus for carrying out any one of the above-mentioned methods according to the first aspect of the invention. In particular, there is provided an animation design apparatus for defining an animation of a virtual object within a virtual world, wherein the animation comprises performing, at each of a series of time points, an update that updates values for object attributes of the virtual object, the apparatus comprising: a display device for providing a visual output to a user; a user input device for receiving an input from a user; and a processor arranged to instruct the display device to display a user interface and to receive input from a user, via the user input device, representing the interaction of the user with the user interface; wherein the processor is arranged to: allow the user to define the update by specifying, on a user interface, a structure representing the update, wherein the structure comprises a plurality of items and one or more connections between respective items, wherein each item represents a respective operation that may be performed when performing the update and wherein a connection between two items represents that data output by the operation represented by one of those two items is input to the operation represented by the other of those two items; allow the user to specify that the structure comprises one or more items in a predetermined category, the predetermined category being associated with a predetermined process such that an item belongs to the predetermined category if performing the respective operation represented by that item requires execution of the predetermined process, wherein said predetermined process may be executed at most a predetermined number of times at each time point (or each time the update is performed); and apply one or more rules that (a) restrict how the user may specify the structure to ensure that performing the defined update does not require execution of the predetermined process more than the predetermined number of times, (b) do not require the user to specify that an item in the predetermined category is at a particular location within the structure relative to other items and (c) do not require the user to explicitly specify which operations need to be performed before execution of the predetermined process when performing the update nor which operations need to be performed after execution of the predetermined process when performing the update.

According to another aspect of the invention, there is provided a computer readable medium storing a computer program for defining an animation of a virtual object within a virtual world, wherein the computer program, when executed by a computer, carries out any one of the above-mentioned methods according to the first aspect of the invention. In particular, there is provided a computer readable medium storing a computer program for defining an animation of a virtual object within a virtual world, wherein the animation comprises performing, at each of a series of time points, an update that updates values for object attributes of the virtual object, wherein the computer program, when executed by a computer, carries out the steps of: allowing a user to define the update by specifying, on a user interface, a structure representing the update, wherein the structure comprises a plurality of items and one or more connections between respective items, wherein each item represents a respective operation that may be performed when performing the update and wherein a connection between two items represents that data output by the operation represented by one of those two items is input to the operation represented by the other of those two items; allowing the user to specify that the structure comprises one or more items in a predetermined category, the predetermined category being associated with a predetermined process such that an item belongs to the predetermined category if performing the respective operation represented by that item requires execution of the predetermined process, wherein said predetermined process may be executed at most a predetermined number of times at each time point (or each time the update is performed); and applying one or more rules that (a) restrict how the user may specify the structure to ensure that performing the defined update does not require execution of the predetermined process more than the predetermined number of times, (b) do not require the user to specify that an item in the predetermined category is at a particular location within the structure relative to other items and (c) do not require the user to explicitly specify which operations need to be performed before execution of the predetermined process when performing the update nor which operations need to be performed after execution of the predetermined process when performing the update.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
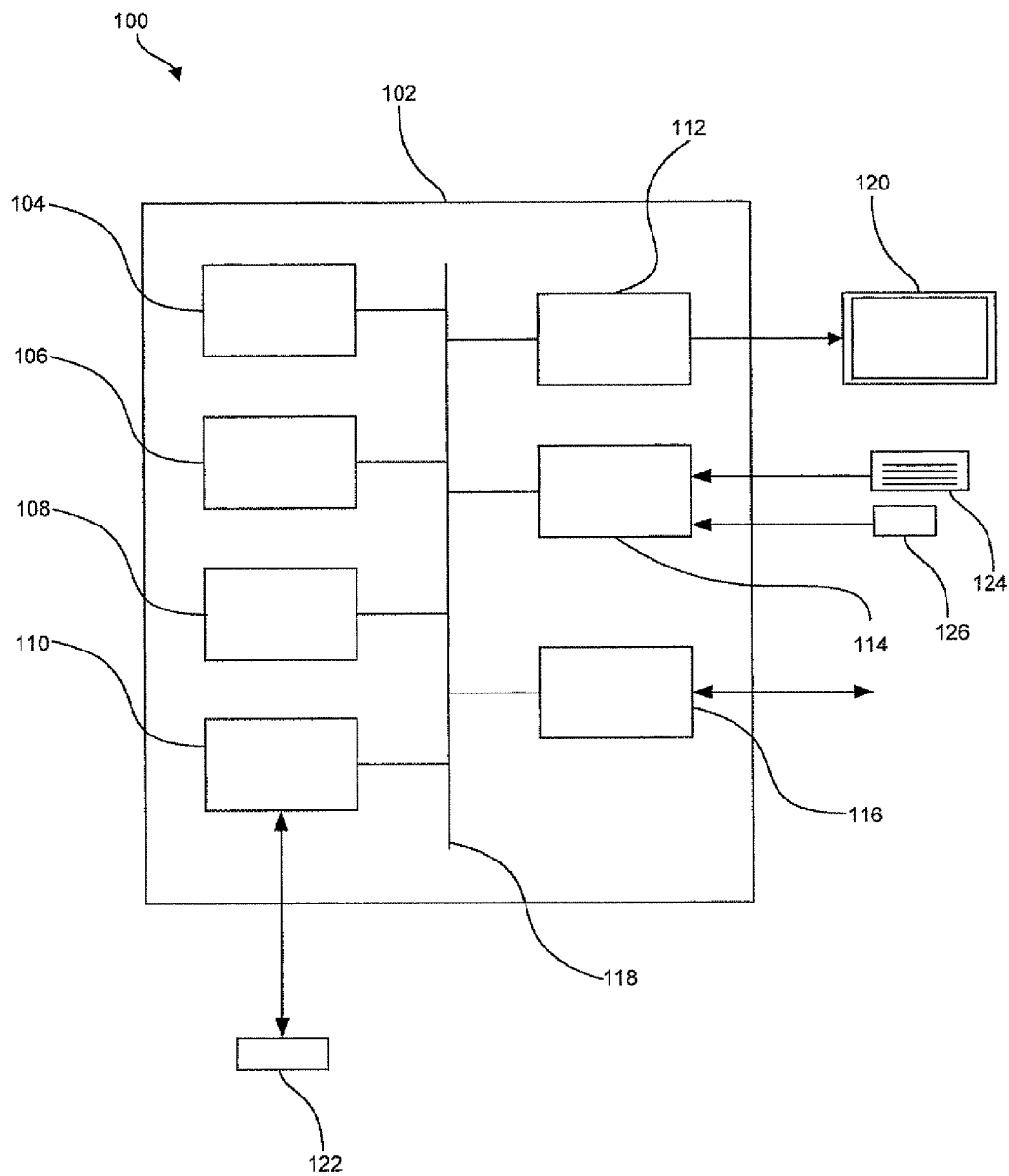
FIG. 1 schematically illustrates an example computer system according to an embodiment of the invention.

Embodiments of the invention may be executed by a computer system. FIG. 1 schematically illustrates an example computer system 100 according to an embodiment of the invention. The system 100 comprises a computer 102. The computer 102 comprises: a storage medium 104, a memory 106, a processor 108, a storage medium interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code) that form part of an embodiment of the invention.

The memory 106 may be any random access memory (storage unit or volatile storage medium) suitable for storing data and/or computer programs (or software or instructions or code) that form part of an embodiment of the invention.

The processor 108 may be any data processing unit suitable for executing one or more computer programs (such as those stored on the storage medium 104 and/or in the memory 106) which have instructions that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel or in cooperation with each other. The processor 108, in carrying out data processing operations for embodiments of the invention, may store data to and/or read data from the storage medium 104 and/or the memory 106.

The storage medium interface 110 may be any unit for providing an interface to a data storage device 122 external to, or removable from, the computer 102. The data storage device 122 may be, for example, one or more of an optical disc, a magnetic disc, a solid-state-storage device, etc. The storage medium interface 110 may therefore read data from, or write data to, the data storage device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices. The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112.

Finally, the network interface 116 provides functionality for the computer 102 to download data from and/or upload data to one or more data communication networks (such as the Internet or a local area network).

It will be appreciated that the architecture of the system 100 illustrated in FIG. 1 and described above is merely exemplary and that other computer systems 100 with different architectures and additional and/or alternative components may be used in embodiments of the invention.

In one embodiment of the invention, a user uses the system 100 to define or create one or more animations (as an animation design tool or animation editor). In another embodiment of the invention, the system 100 may be used to perform or process and output the one or more animations that have been defined. The same system 100 or different systems 100 may be used for the animation creation processing and the animation performance processing. This is described in more detail below.

Figure 2:
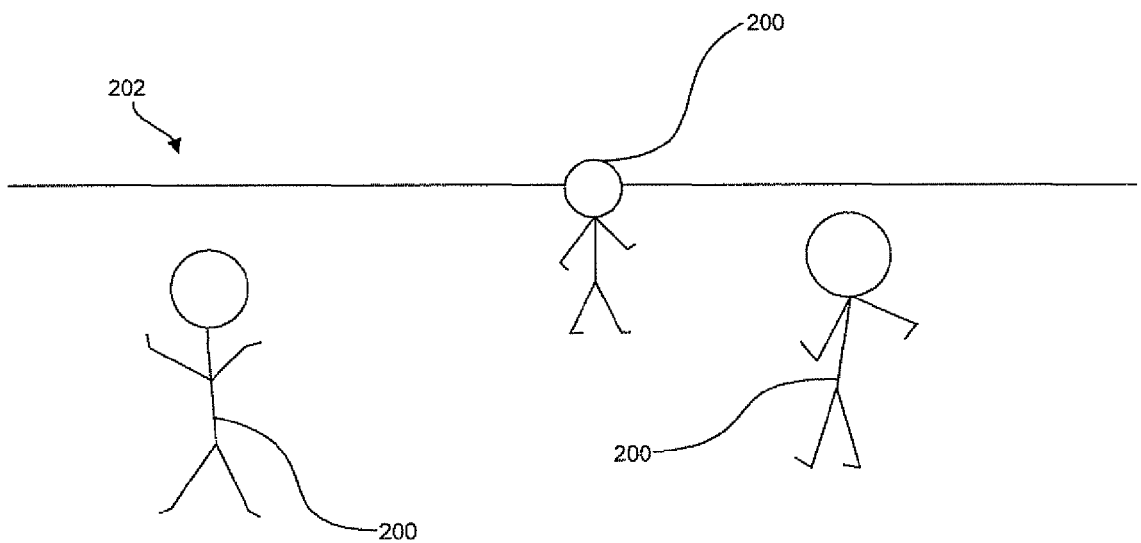
FIG. 2 schematically illustrates three example virtual objects within a virtual world.

Embodiments of the invention are concerned with animations and, in particular, how to define an animation of a virtual object (or a character) that is located (or resides) within a virtual world (or environment). FIG. 2 schematically illustrates three example virtual objects 200 within a virtual world 202. The virtual objects 200 shown in FIG. 2 (and the rest of this application) represent human beings, but it will be appreciated that embodiments of the invention are equally applicable to animations of virtual objects that represent other articles, items, animals, etc. and other types, structures and forms of object that have different intended representations. The virtual world 202 may be any virtual environment, arena or space containing the virtual objects 200 and in which the virtual objects 200 may be moved or animated. Thus, the virtual world 202 may represent a real-world location, a fictitious location, a building, the outdoors, underwater, in the sky, a scenario/location in a game or in a movie, etc.

Each virtual object 200 has various associated object attributes, such as the position (i.e. location and orientation) of various parts of the object 200 within the virtual world 202. For example, for an object 200 representing a human being, the attributes may include: the overall position and orientation of the object 200 within the virtual world 202; the position and orientation of limb parts; the position and orientation of hands, feet, the head, etc.

An animation source for (or associated with) an object 200 is a collection of data from which values for the various object attributes can be derived at each time-point in a series (or sequence) of time-points. These time-points may correspond to video frames, video fields, or any other time or display frequency of interest. The animation source may explicitly store, for each time-point, the values for the object attributes. Alternatively, the animation source may store, for one time-point, the difference between the value for an object attribute at that time point and the value for that object attribute at a preceding time point (i.e. using differential encoding). Other ways of storing/encoding the data for the animation source are possible. Consequently, the animation source represents how the object 200 moves from time-point to time-point in the sequence of time-points. For ease of explanation, the rest of this description shall refer to frames (and a sequence of frames) as an example of time-points (and the sequence of time-points for the animation). However, the skilled person will appreciate that embodiments of the invention relate to time-points in general and not just video frames (or video images).

Examples of animation sources include, for example, data representing a person running, data representing a person walking, data representing a person jumping, etc., where these various sets of data may be used to set the attributes of the object 200 so that the object 200 (when displayed on the monitor 120) appears to be performing the respective animation/movement (e.g. running, walking, jumping, etc.).

Different object types may have different sets of one or more animation sources—for example, an object 200 representing a dog will have a different "physical" structure from that of an object 200 representing a human, and therefore separate distinct animation sources will be associated with the different dog and human objects 200.

An animation source may be stored, for example, on the storage medium 104. The storage medium 104 may store a database comprising one or more animation sources for one or more types of object 200. Additionally or alternatively, the data for one or more animation sources may be stored in the memory 106 or in the data storage device 122, or may be accessible to the computer 102 from a location accessible via the network interface 116.

An animation for the object 200 then comprises performing, at each time point in a series of time points, an update process that updates values for the object attributes of that object 200. This update process could involve simply determining values from an animation source for the object 200 in order to update (or set) the corresponding object attributes with those values accordingly. However, as described in more detail later, this update process could involve determining values from one or more animations sources for the object 200 and performing one or more data processing steps/procedures/functions on those values in order to obtain a final set of values with which to then update (or set) the corresponding object attributes accordingly. For example, a "running" animation source for an object 200 and a "walking" animation source for that object 200 could be blended together to form a "jogging" animation for that object 200, with that "jogging" animation then being blended with a "limp" animation to produce a "limping-jog" animation for the object 200. This processing could be dependent on a variety of factors—for example, when an animation is being performed and output as part of a computer game, the animation may switch between a "running" animation and a "walking" animation for an object 200 in dependence upon an input from a user received during the game play.

In the embodiments described below, the animations relate to so-called "skeletal animation", but it will be appreciated that different types or styles of animation fall within the scope of the present invention. The object attributes for an object 200 may be represented by some or all of the following data (depending on the type of animation and how the object 200 and its attributes are to be represented): (a) topological data; (b) geometric data; (c) physical data; (d) trajectory data; (e) skinning data; and (f) rendering data. These data are described in more detail below. It will be appreciated that the object 200 may have attributes in addition to, or as alternatives to, the attributes as described below with reference to the various data (a)-(f). The geometric data and the trajectory data may be collectively referred to as transform data.

Figure 3:
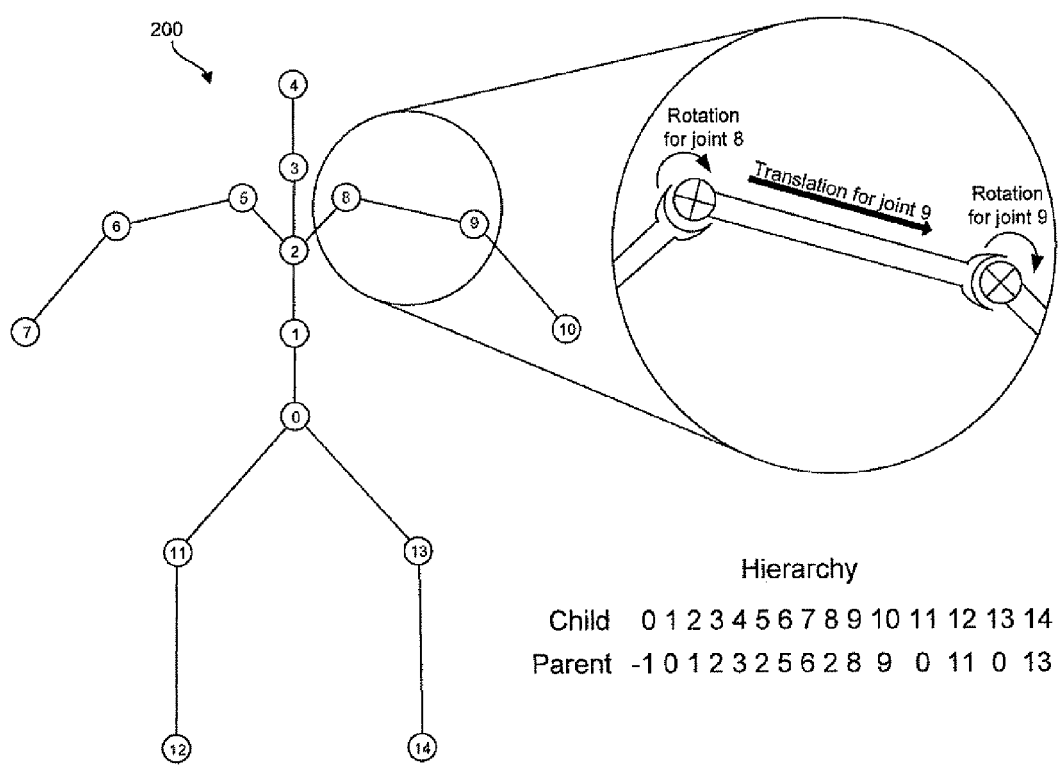
FIG. 3 schematically illustrates an object in an animation according to an embodiment of the invention.

FIG. 3 schematically illustrates an object 200 in an animation according to an embodiment of the invention. The object 200 comprises a plurality of object sections (or "bones") linked together by respective joints. In FIG. 3, the sections of the object 200 are the straight lines whilst the joints of the object 200 are the numbered circles.

In general, a joint is a (simulated) point of contact between two or more object sections so that that joint links (or creates an association between) those sections. In other words, such a joint forms a simulated connection or tie between object sections (in the same way that, for example, a forearm is connected to an upper arm by virtue of an elbow joint). In this way, an object section may have one or more joints associated with it. A joint normally occurs at an end of the object section(s) it is associated with.

Some joints (such as joint 10 in FIG. 3) occur at the end of an object section, but do not link that section to another section. These joints merely serve to indicate the location of the free (i.e. unconnected) end of that section.

In some embodiments, each object section is "rigid" in that the distance between the joints associated with that section is constant, although, of course, each rigid section may have its own length/distance which may be different from the length/distance for the other rigid sections. However, it will be appreciated that in other embodiments one or more of the sections of the object 200 may not be "rigid".

The object 200 may therefore be considered to comprise a plurality of object parts. In some embodiments, the topological data represents the object 200 as a plurality of joints (i.e. the object parts are just the joints). In some embodiments, the topological data represents the object 200 as a plurality of object sections (i.e. the object parts are just the bones). In some embodiments, the topological data represents the object 200 as a plurality of joints together with a plurality of object sections. The actual representation does not matter for embodiments of the invention and therefore in this description the topological data shall represent the object 200 as a plurality of joints. However, the skilled person will appreciate that the following description may be applied analogously to the alternative styles of representation.

The object parts may be considered as forming a skeleton, or framework, for the object 200.

The object parts (joints in this representation) are linked together, or are associated with each other, in a hierarchy. The hierarchy of joints illustrated in FIG. 3 may be represented by table 1 below:

TABLE 1

| | Joint ID | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Parent ID | −1 | 0 | 1 | 2 | 3 | 2 | 5 | 6 | 2 | 8 | 9 | 0 | 11 | 0 | 13 |

In this hierarchy of joints for the object 200, each joint, other than a central, basis root joint (labelled with a joint ID of 0) is a child of another joint in the hierarchy, i.e. every joint other than that root joint is associated with (or linked to) a second joint in the hierarchy (by virtue of a connecting object section), where that second joint is considered to be the parent of that joint. The fact that the central joint is not a child of another joint (and therefore has no parent joint) is represented in table 1 by indicating a parent ID of −1. For example, joint 2 is a child of joint 1 and itself has three children, namely joints 3, 5 and 8. As another example, joint 10 is a child of joint 9, but has no children itself. A joint such as joint 10 that has no child joints (i.e. a joint that is not itself a parent) is included so as to represent a "terminating end" of a section of the object 200, i.e. to indicate the location of the extremities of the object 200. Due to the connecting nature of the object sections that link joints, the movement, position and orientation of a joint in the virtual world 202 is affected by the movement, position and orientation of the parent of that joint in the virtual world 202.

Figure 4:
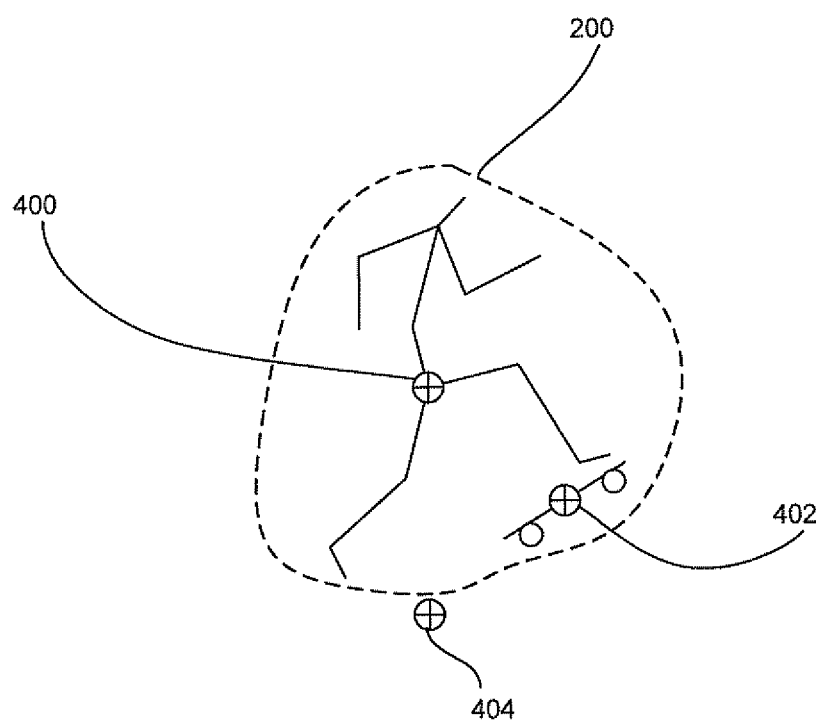
FIG. 4 schematically illustrates a compound object representing a person on a skateboard.

An object may have multiple root joints. For example, FIG. 4 schematically illustrates a compound object 200 representing a person on a skateboard. This may be considered one object as the person and the skateboard may be considered to be one set of semantically linked data (i.e. a single character). However, as the person and the skateboard are not rigidly or permanently attached to each other, they each have their own root joints, namely a root joint 400 for the person and a root joint 402 for the skateboard. The joints for the person will then be hierarchically related to the root joint 400, whilst the joints for the skateboard will be hierarchically related to the root joint 402.

The topological data for the object 200 is data that represents this hierarchy (or hierarchies) or structure of the object parts, i.e. data defining the parent-child relationships between the various object parts that make up the object 200. For example, the topological data for the object 200 may be stored in the form of table 1 above.

The geometric data for the object 200 represents the relative positions and orientations of the object parts. The values given to the geometric data represent the positioning of the object 200 in a particular posture. In effect, the attributes for the object 200 represented by the geometric data are the length of each object section (bone) together with that bone's orientation relative to its parent bone, i.e. this geometric data represents the distance between a joint and its parent joint, together with the orientation of that joint relative to the parent joint. There are many well-known ways of representing this geometric data, such as: (a) using respective transformation matrices for the joints; (b) using respective pairs of 3×3 rotation matrices and 1×3 translation matrices; or (c) using respective quaternions. As these methods are well-known, and as the particular method used is not important for embodiments of the invention, these methods shall not be described in more detail herein. An example representing some of the geometric data for joints 8 and 9 is shown in FIG. 3.

The geometric data for a particular joint is normally defined in a coordinate space local to the parent of that joint (i.e. in which that parent is fixed). Thus, for example, if a "shoulder joint" 8 of FIG. 3 moves but the "elbow joint" 9 of FIG. 3 does not move relative to the shoulder joint, then the geometric data 308 for the elbow joint would not change.

The attribute of the object 200 represented by the trajectory data is the location and orientation in the virtual world 202 of a so-called "trajectory joint" 404 for the object 200. The trajectory joint 404 is used as a representative location of the object 200 within the world 202. Thus, different values for the trajectory data place the trajectory joint 404 (and hence the object 200) at different locations in the virtual world 202.

The trajectory joint 404 is usually not an actual joint of the object 200 (i.e. it need not a form part of the structure of the object 200), but is simply a position and orientation within the world 202 to represent the overall location and orientation for the object 200. For convenience, the trajectory joint 404 may be represented as a "special" joint within the hierarchy represented by the topological data. The trajectory joint 404 need not be a root joint (with no parent) but can be located anywhere within the skeleton topology as represented by the topological data. However, for its uses as will be described below it is the location and orientation of the joints of the object 200 (as specified by virtue of the topological data and the geometric data) relative to the trajectory joint 404 that is important and that results in a particular joint or object section being at a particular/absolute position and orientation within the entire virtual world 202. One way of viewing or implementing this is for all joints of the object 200 (as specified by the topological data), including root joints, to be ultimately parented to the trajectory joint 404 so that their location and orientation within the virtual world 202 can be calculated based on the trajectory data, the topological data and the geometric data.

The trajectory joint 404 has two main uses for animation processing:

The trajectory joint 404 may be used when animations are to be concatenated, where the object 200 is moving away from some origin in the world 202. For example, for a concatenation of a first animation of the object 200 running and a second animation of the object 200 jumping, the object 200 should not be returned to a starting position within the virtual world 202 at the transition between the first and the second animations. By lining up the trajectory joint 404 of the second animation with that of the first animation at the point of transition the motion for the object 200 is continuous. This is also applicable to cyclical animations, where the second animation is the same as the first animation (such as a walk cycle in which a walk animation is simply repeated).

The trajectory joint 404 may be used for blending animations together. For example, when blending an animation of the object 200 turning to the left with an animation of the object 200 running to the right, then if these animations were simply blended together without moving them into a common frame of reference, then they would partially cancel out each other's movements. Consequently, when performing a blend between two or more animations for the object 200, the blending processing is performed as if the two animations share a common trajectory joint 404.

The orientation of a trajectory joint 404 is just as important as its position, as it represents the overall direction that the object 200 is facing.

The trajectory data may be represented as a delta transform attribute for the object 200, this attribute representing the motion of the trajectory joint 404 from a preceding time-point to a current time point.

Figure 5:
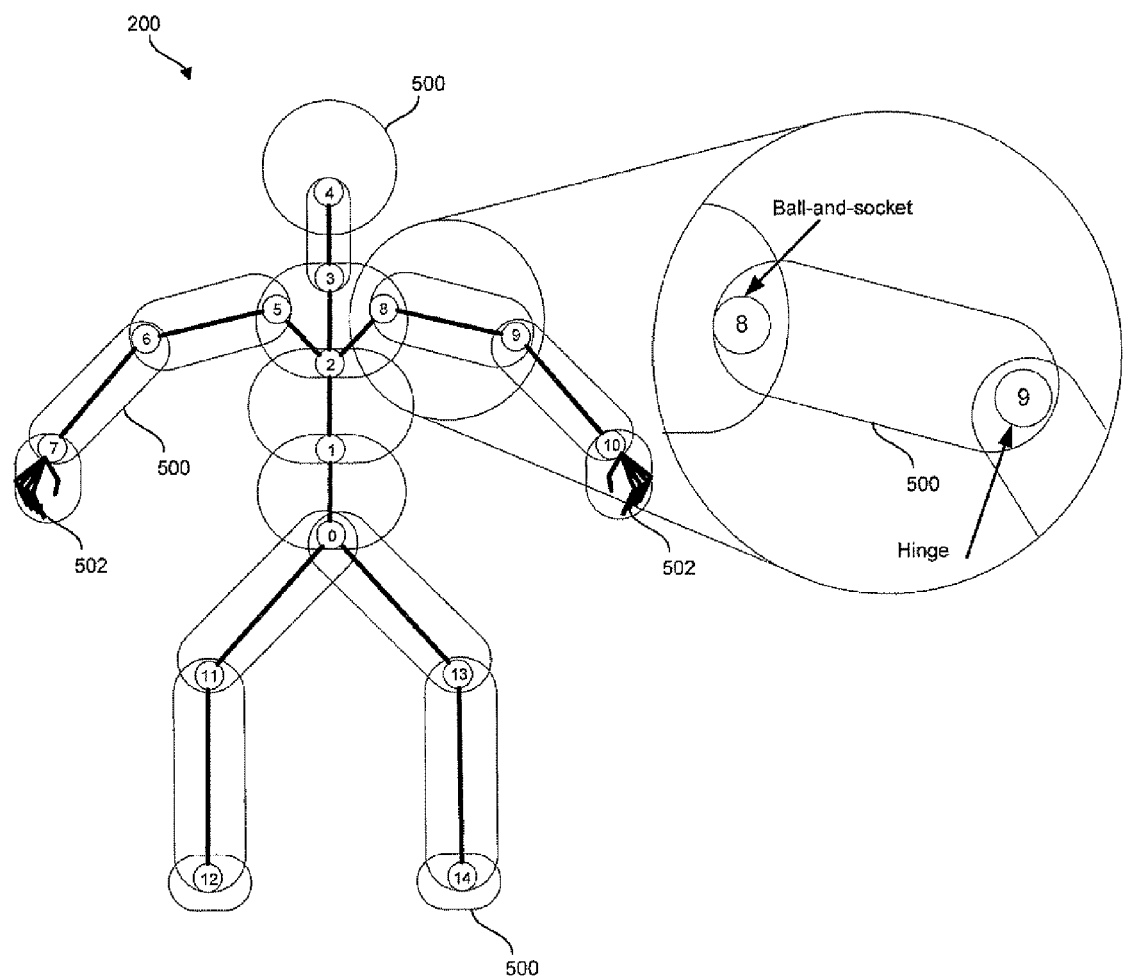
FIG. 5 schematically illustrates regions, represented by physics data, for the joints for the object of FIG. 3.

The physical data represents various physical attributes for the object 200. These physical attributes represent or impose various physical properties or restrictions or limitations on the object 200. Typically, subsets of the physical data are associated with respective joints represented by the topological data. For example, one or more of the joints represented by the topological data may have corresponding physical data representing attributes such as:

Size and shape of a region around that joint. The region may be a capsule or a cylinder, with the size and shape being defined by lengths and radii accordingly. The region may represent the body, or the "bulk", of the object 200 that is supported by the framework of bones and joints. If another object 200 were to enter this region, then the two objects 200 may be considered to have collided. FIG. 5 schematically illustrates such regions 500 for the joints for the object 200.

A mass for the joint.

An inertia property for the joint.

Other properties of the joint such as strength, damping factors, type of joint. For example, the "shoulder" joint 8 in FIG. 5 may be a ball-and-socket joint whilst the "elbow" joint 9 in FIG. 5 may be a hinge joint. Such data may therefore restrict how one joint may move (e.g. hinge or rotate or pivot) with respect to another joint (a parent or a child joint).

However, as shown in FIG. 5, some of the joints 502 represented by the topological data may not have corresponding physical attributes.

The skinning data is data that enables so-called "skinning" for the animation. The process of skinning takes a definition of the surface of the object 200 and attaches it to the skeleton formed by the object parts (the joints and/or bones). The skinning data is therefore data defining this object surface, which is an attribute of the object 200.

The rendering data is data that enables so-called "rendering" of the animation. The process of rendering actually outputs or displays the skinned surface with relevant textures, colours, lighting, etc. as appropriate. The rendering data is therefore data defining the textures, colours, lighting, etc., which are attributes of the object 200.

Figure 30:
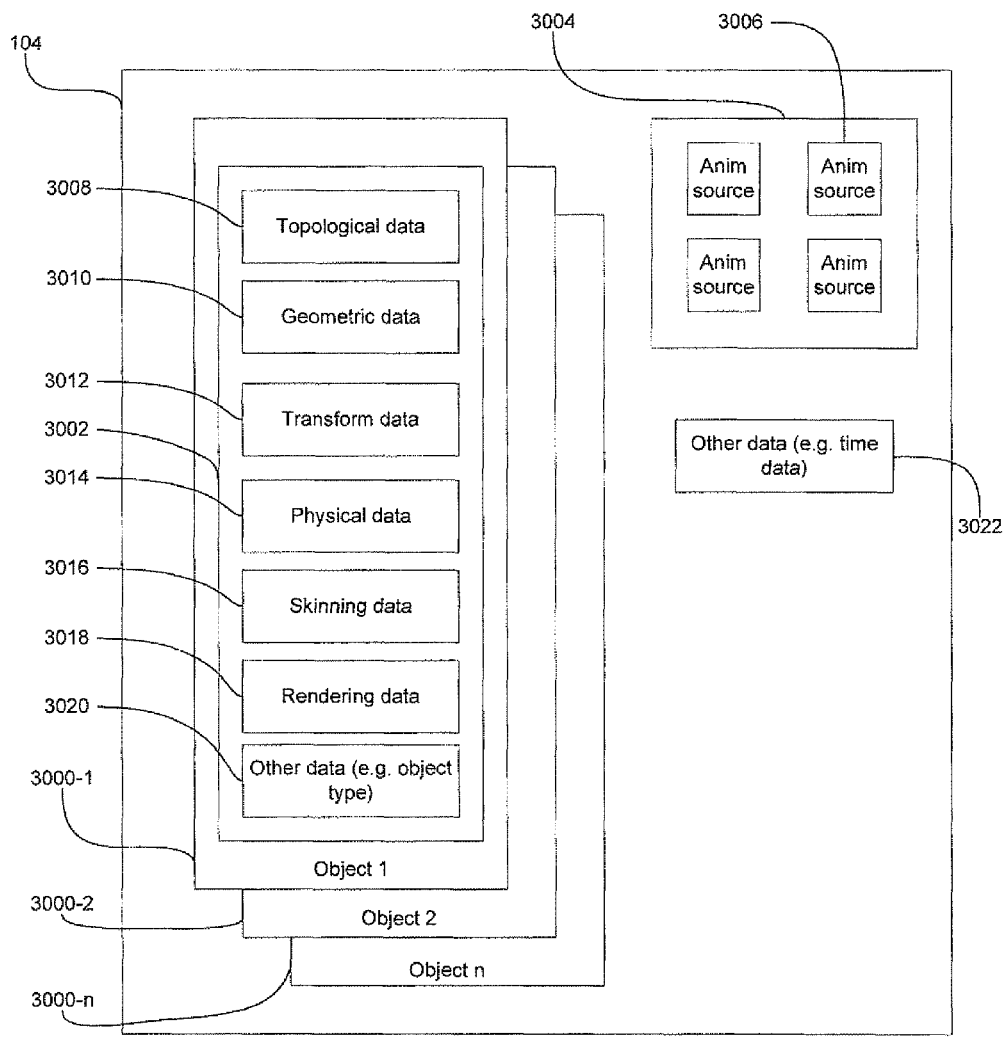
FIG. 30 schematically illustrates some of the data that may be stored in embodiments of the invention.

FIG. 30 schematically illustrates some of the data that may therefore be stored in the storage medium 104 (or additionally or alternatively stored in the memory 106 or the data storage device 122, or which may be accessible via the network interface 116). There may be a set or database 3004 of one or more animation sources 3006. Each animation source 3006 will be applicable to a particular object type and a particular action type (e.g. walking, running and jumping animation sources for human objects 200, and walking, running and jumping animation sources for cat objects 200). There may be respective data 3000 for one or more objects 200—in FIG. 30, there are n objects 200, each with their own data 3000-1, 3000-2, ..., 3000-n. The data 3000 for an object 200 may include a set 3002 of attribute data for that object 200, including one or more of: topological data 3008; geometric data 3010; trajectory data 3012; physical data 3014; skinning data 3016; rendering data 3018; and other data 3020 specific to that object (e.g. a type of the object 200, so that appropriate animation sources 3006 may be used accordingly for that object 200). There may also be stored other data 3022 (such as timing data) which is not specific to any one particular object 200.

As mentioned above, the animation of a virtual object 200 within a virtual world 202 comprises performing, at each frame of a series of frames (or other time points), an update that updates values for (or assigned to) the object attributes for that virtual object 200. In other words, at each frame during an animation of an object 200, an update process (or procedure) is carried out that updates (i.e. sets) the object attributes for the object 200 according to values that the update process determines for those attributes. Each virtual object 200 within the virtual world 202 undergoes its own update process for each frame.

Embodiments of the invention provide methods and systems for allowing a user to describe or define the update process for a virtual object 200. In particular, embodiments of the invention allow a user to define the update by specifying, on a user interface, an animation structure (or graph or network) representing the update process for a virtual object 200. This is described in more detail below. Different virtual objects 200 may have their own respective animation structures defined for them, and the animation editor provided by embodiments of the invention may allow a user to define multiple animation structures.

An animation structure comprises a plurality of items (or nodes or functional units) and one or more connections between respective items. In summary, each item represents a respective operation (or data processing or functionality or computation or calculation) that may be performed when performing the update (e.g. providing initial values for object attributes, or updating/calculating intermediate and/or final values for the object attributes, or calculating intermediates needed for computation or secondary data associated with the object such as marking that significant events have occurred during the animation, or calculating non-attribute values, such as an adjusted time-value), whilst a connection between two items represents that data output by the operation represented by one of those two items is input to the operation represented by the other of those two items. For example, an operation represented by a first item may calculate an intermediate (or temporary) value for an object attribute and output this as data to an operation represented by a second item that takes this intermediate value and processes it to form a different value for that object attribute. The functionality represented by an item in the structure may, indeed, be any particular functionality that may be useful or required for implementing an update process (from a complex blending of data from two or more animation sources to more simple operations such as arithmetic on data values).

In the description that follows, the term "graph" shall be used, but it will be appreciated that this may mean an animation structure or an animation network. Similarly, the term "node" shall be used, but it will be appreciated that this may mean an item or a unit or an element of the graph which may be connected (or linked) to other nodes of the graph via connections of the graph. As mentioned above, a node represents various processing to be performed for the update process of the animation. In the description that follows, the concept of "node" and the concept of "processing represented by the node" are sometimes used interchangeably—this is simply to improve the clarity of the disclosure.

Figure 6:
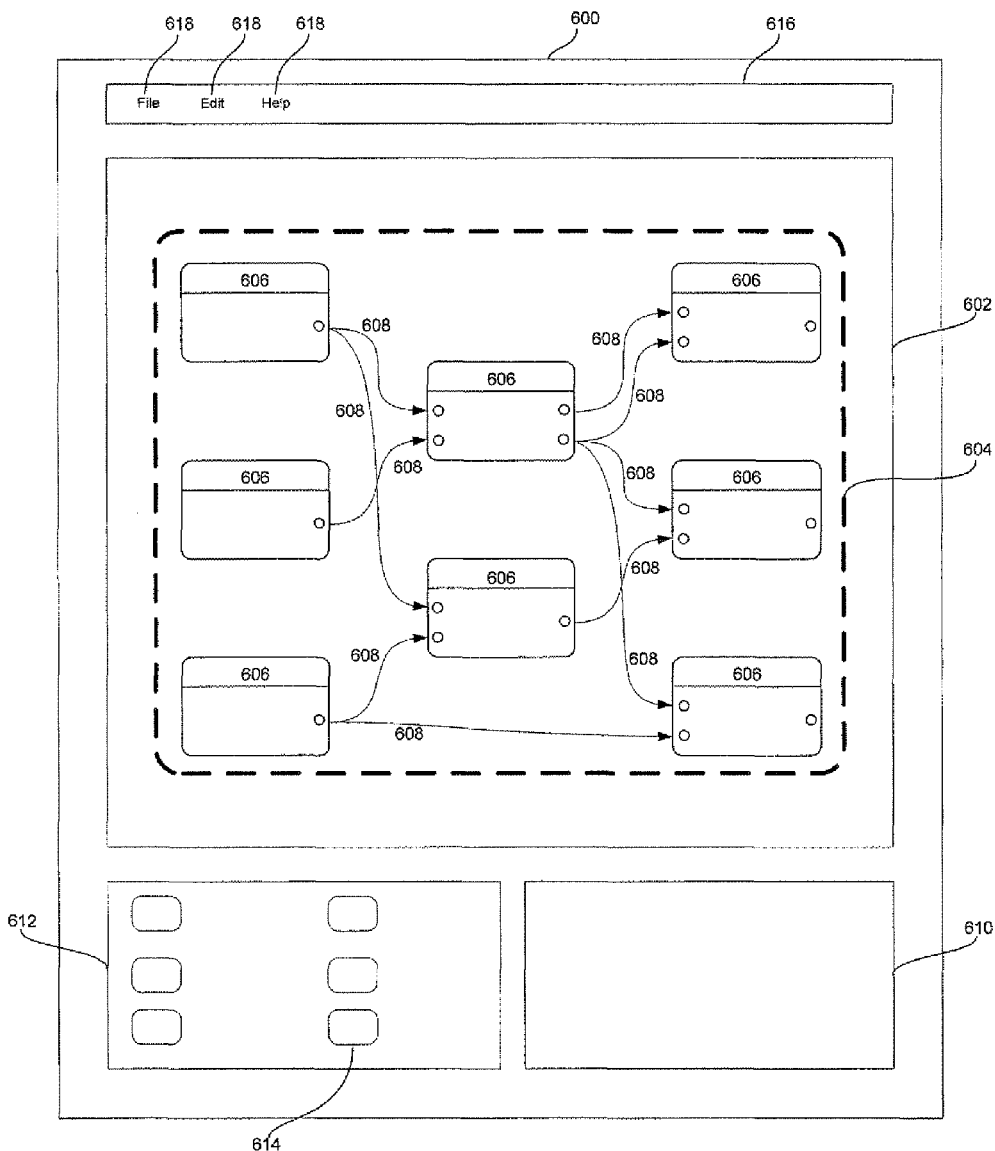
FIG. 6 schematically illustrates an example user interface 600 according to an embodiment of the invention.

FIG. 6 schematically illustrates an example user interface 600 according to an embodiment of the invention. The user interface 600 is displayed on the monitor 120 of the computer system 100 of FIG. 1. The user interface 600 is generated by the processor 108 executing one or more of the computer programs (stored as described above) according to embodiments of the invention as described below.

The user interface 600 comprises a graph definition area 602, a menu area 616, an information area 610 and a node selection area 612, as discussed below.

The graph definition area 602 displays a representation of an update process for an animation of an object 200 in the form of a graph. A dashed line 604 in FIG. 6 encompasses a graph that is composed of various nodes 606 that are linked together (i.e. are interconnected) via respective connections 608. The nodes 606 are represented in the graph definition area 602 as functional blocks (or boxes) whilst the connections 608 are represented in the graph definition area 602 as lines between the various blocks. In preferred embodiments, the block representing a node 606 displays a name for that node 606 (to thereby display an indication of the processing or functionality associated with the operation represented by that node 606). It will be appreciated that embodiments of the invention may make use of other ways to visually represent nodes 606 and connections 608.

The user may select one of the nodes 606 or one of the connections 608 by using the mouse 126 to position a cursor (not shown in FIG. 6) displayed on the monitor 120 over the desired node 606 or connection 608 and then pressing a button of the mouse 126. However, it will be appreciated that embodiments of the invention may make use of other methods to allow the user to select nodes 606 and connections 608 (e.g. by using a Tab key on the keyboard 124 to switch the current selection from one node 606 or connection 608 to another node 606 or connection 608).

The user may delete a node 606 from the graph by selecting the node 606 and then pressing a Delete key on the keyboard 124.

The user may move a node 606 within the graph definition area 602 by selecting the node and, in doing so, keeping the mouse button depressed and then moving the mouse 126 to position the cursor (and hence the node 606) at the desired position within the graph definition area 602.

As will be described in greater detail later, there are many different types of node 606, each node type corresponding to a respective particular operation that may be performed when performing the update. The node selection area 612 displays one or more node type indicators 614, each representing a respective node type.

In order to add a node 606 of a particular node type to the graph being displayed in the graph definition area 602, the user may select the corresponding node type indicator 614. For example, the user may use the mouse 126 and double-click on the node type indicator 614. The user interface 600 is then arranged to add a node 606 of that node type to the graph and display that node 606 within the graph definition area 602. The user may then position the newly added node 606 within the graph definition area 602 as described above. Alternatively, the user may perform a drag-and-drop operation to drag a node type indicator 614 from the node selection area 612 into the graph definition area 602 to thereby place a node 606 of that node type within graph definition area 602.

As shown in FIG. 6, a node 606 is depicted in the graph definition area 602 with one or more small circles (sometimes referred to as "pins") which represent data inputs and data outputs for the operation represented by that node 606 (or data inputs and outputs for the node 606). A node 606 may have zero or more data inputs and/or one or more data outputs. Each data input and data output is associated with respective data value(s) that the node 606 expects to receive as an input or transfer as an output. As an example, the data values could be time, transform data for the entire object 200, transform data for one or more parts of the object 200 (e.g. transform data just for the head or a limb of a person), etc., and a node 606 may have, for example, two inputs, one of which is intended for receiving time data and the other of which is intended for receiving transform data. An indication of these data values may be displayed next to the respective circle for the data input or data output to guide the user accordingly. Usually, data inputs are displayed via circles on the left hand side of the block representing the node 606 and data outputs are displayed via circles on the right hand side of the block representing the node 606 (but this "convention" shall be discussed in more detail later). A user may add a connection 608 between a first and a second node 606 by selecting one of the small circles on the first node 606 and then selecting one of the small circles on the second node 606, or by performing a drag-and-drop operation between an output circle of one node 606 and an input circle of the other node 606 (or vice versa). In doing so, the user interface 600 may check that the data type for the output is compatible with the data type for the input for this new data connection 608 (to ensure, for example, that time data is not going to be output via the new connection 608 to an input that expects to receive transform data). If the user interface 600 detects such an incompatibility then it may warn the user (via a message box displayed on the monitor 120) and not add the connection 608. A user may delete a connection 608 by selecting that connection 608 and pressing a Delete key on the keyboard 124.

It will be appreciated that embodiments of the invention may make use of other user interface and user interaction techniques to allow a user to add connections 608 to and delete connections 608 from the graph that is being defined within the graph definition area 602. It will also be appreciated that embodiments of the invention may make use of other user interface and user interaction techniques to allow a user to add, move and delete nodes 606 from the graph that is being defined within the graph definition area 602.

The information area 610 may display any relevant information. For example, when a user selects a node type indicator 614 or a node 606, then information regarding the operation associated with a node of the type indicated by that node type indicator 614 or with that node 606 may be displayed in the information area 610. The information area 610 may also have one or more controls (which may change depending on the current context of the user interface 600, e.g. which node 606 or connection 608 has been selected) via which the user may select or input various properties or parameters for the graph or a particular node 606 (e.g. properties or parameters for a node 606 or a connection 608 which has been selected by the user).

The menu area 616 may have one or more selectable menus 618 via which the user may perform a variety of tasks, such as loading a graph (or animation definition) for display as a graph in the graph definition area 602 (so that the user can continue to define that graph or can use that loaded graph as a template to form new graphs) and saving the currently defined graph (or animation definition). The graphs may be loaded from or saved to the storage medium 104 or the data storage device 122.

It will be appreciated that the particular layout of the user interface 600 described above with reference to FIG. 6 is purely exemplary and that embodiments of the invention may make use of other forms of user interface, with other types of controls (such as buttons, check-boxes, radio buttons, etc.) to allow the user to interact with the user interface. Preferably the user interface used in embodiments of the invention allows the user to define a graph to represent an update process for an animation of an object 200, where the graph comprises nodes that are connected by one or more connections, the user being able to add and remove nodes and connections as appropriate in order to arrive at the required representation of the update process.

Figure 7:
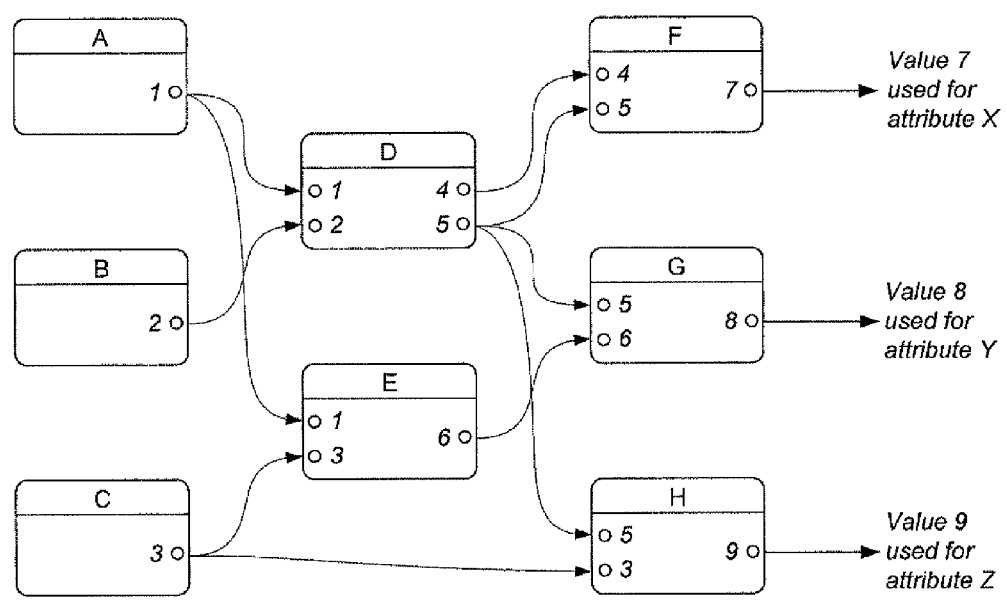
FIG. 7 illustrates an example graph that may be constructed using the user interface of FIG. 6.

FIG. 7 illustrates an example graph that may be constructed using the user interface 600.

As illustrated, data may be passed from a source node to one or more target nodes. This is shown in FIG. 7 by arrows on the connections between the nodes, although in embodiments of the invention the user interface 600 need not make use of arrows as the direction of flow of data is usually clear from the context (data outputs being on the right of a node and data inputs being on the left of a node). The graph shown in FIG. 7 is therefore "directed", meaning that the direction of the flow of data between nodes of the graph is specified. The data being passed between two nodes via a connection may represent any values, or data entities, or properties/aspects of an animation, and may, for example comprise values corresponding to one or more attributes of the object 200 associated with the animation whose update process is represented by the graph, values representing time, values representing volatile intermediate data needed only during the computation for the update process, values representing control parameters or static data, data received from the application that executes the update process (e.g. a computer game), etc. Thus, some or all of the data being passed between two particular nodes may relate to object attributes; similarly, though, some or all of the data being passed between two particular nodes may relate to data/values that do not represent object attributes.

In FIG. 7, there are 8 nodes (nodes A-H) and various data values 1-9 that are passed between the nodes A-H or that are output, as described below:
  the operation represented by node A outputs data values 1 to be inputs to the operations represented by nodes D and E;
  the operation represented by node B outputs data values 2 to be inputs to the operation represented by node D;
  the operation represented by node C outputs data values 3 to be inputs to the operations represented by nodes E and H;
  the operation represented by node D receives and processes data values 1 and 2, to generate and output data values 4 and 5, with data values 4 being output to the operation represented by node F and with data values 5 being output to the operations represented by nodes F, G and H;
  the operation represented by node E receives and processes data values 1 and 3, to generate and output data values 6, with data values 6 being output to the operation represented by node G;
  the operation represented by node F receives and processes data values 4 and 5, to generate and output data values 7;
  the operation represented by node G receives and processes data values 5 and 6, to generate and output data values 8; and
  the operation represented by node H receives and processes data values 3 and 5, to generate and output data values 9.

The data values 7, 8 and 9 are the final output from the update process represented by graph shown in FIG. 7. Thus, the data values 7, 8 and 9 (being the data values which are not passed onto a subsequent node) may be values to which the attributes of the object 200 are to be set as a result of the update process for the object 200. In FIG. 7, the update process is shown as setting an attribute X to the value represented by data values 7, setting an attribute Y to the value represented by data values 8, and setting an attribute Z to the value represented by data values 9. The data values 7, 8 and 9 could therefore represent, for example, values for the trajectory data (to update the position and orientation of the trajectory joint 404) and values for the geometric data (to update the position and orientation of one or more of the joints of the object 200 to thereby affect its posture).

Figure 8:
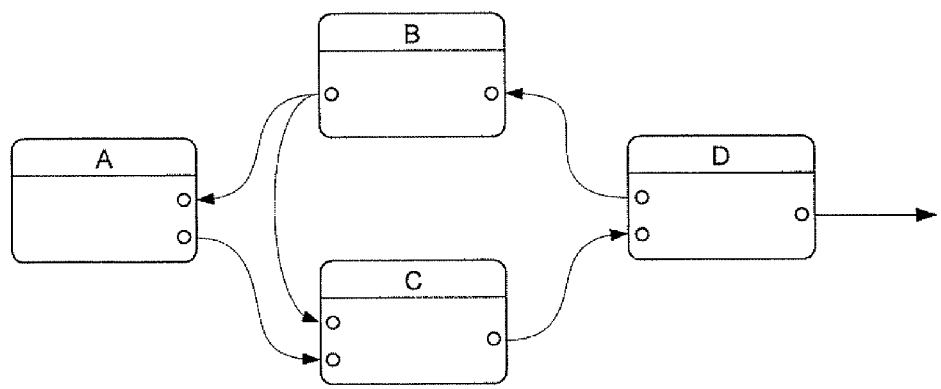
FIG. 8 illustrates an example of a graph that has a so-called "cyclic dependency"

FIG. 8 illustrates an example of a graph with four nodes, nodes A-D. This graph has a so-called "cyclic dependency", as the values output from node D are dependent on the values output from node C, which are dependent on the values output from node B, which are dependent on the values output from node D. This cyclic dependency could lead to multiple possible computation results depending on the order in which various processing is performed. Hence, in preferred embodiments of the invention, the user interface 600 does not allow the user to create graphs in the graph definition area 602 that have a cyclic dependency. When a user attempts to add a connection 608 between two nodes 606, the user interface 600 checks whether a cyclic dependency would be created by the addition of that connection 608. This may be performed by an exhaustive recursion through the graph that would be obtained if that connection 608 were added. If a cyclic dependency would be created, then the user interface 600 may display a warning to the user that the addition of that connection 608 is not allowed (e.g. warning text in a message box displayed by the user interface 600), and the connection 608 is then not added to the graph. The graph shown in FIG. 7 does not have a cyclic dependency, and is therefore a so-called "directed acyclic graph". Such a graph shall be referred to herein as a DAG.

Before discussing in detail the various types of node and the various rules that may be applied by embodiments of the invention, it is worthwhile mentioning at this point how the processor 108, when executing a computer program, would "evaluate" a DAG, i.e. would actually determine how to carry out the various processing operations specified by the DAG to perform the corresponding update process and then carry them out to determine the output values from the DAG. Embodiments of the invention may carry out the process described below each time the update process is to be performed. For example, when actually carrying out (or performing or outputting) the animation defined and represented by the DAG (e.g. when the processor 108 is executing a computer game in which a character is to be animated in accordance with the animation defined by the DAG), then for each video frame, the processor 108 carries out the update process for that character in accordance with the DAG as follows.

The processor 108 may generate a sequence (or ordered list) of nodes (or at least identifiers of nodes or the operations represented thereby), which shall be referred to below as an "operations queue". The operations queue represents an order in which the various operations represented by the nodes of the DAG may be executed in order to correctly perform the update process as intended by the designer of the DAG. This may be referred to as "compiling" the DAG into an operations queue. A particular DAG may have many different valid operations queues, and there are many different ways of compiling a DAG into a corresponding operations queue, such as the so-called "width-first compilation" and the so-called "depth-first compilation", as will be described in more detail below.

In order to generate an operations queue from a DAG in order to carry out an update process to update the value of a single specific attribute of an object 200, an operations queue is initialised to be empty (i.e. to identify no nodes 606) and then the node 606 of the DAG that outputs the final value for that attribute is added to the operations queue. Then, the operations to update each of the input data values for that node 606 (i.e. the data values on which that node 606 is dependent) are determined and the nodes 606 representing those operations are added to the operations queue. This is continued recursively for each of the nodes 606 added to the operations queue until no more nodes 606 need to be added to the operations queue. If a node 606 that is added to the operations queue has already been added to the operations queue, then that already-present occurrence of the node 606 in the operations queue is removed from the operations queue—thus, a node 606 will occur at most once in the final operations queue.

In a width-first compilation, each node 606 on which a given node 606 depends is added to the operations queue before determining what further nodes 606 need to be added to the operations queue to update the input data values for those added nodes 606. In depth-first compilation, as soon as a node 606 is added to the operations queue, then the further nodes 606 that are needed to update each of its input data values are determined and added to the operations queue.

Using the DAG of FIG. 7 as an example, a width-first compilation of the DAG would result in the following operations queues to update attributes X, Y and Z respectively:

Attribute X (using value 7): B A D F
Attribute Y (using value 8): B A C E D G
Attribute Z (using value 9): B A C D H The above operations queues are constructed from right-to-left, but the processor 108 would execute the operations represented by the nodes 606 in the left-to-right order along the operations queues.

In contrast, a depth-first evaluation would result in the following operations queues:

Attribute X (using value 7): B A D F
Attribute Y (using value 8): C A E B A̶ D G
Attribute Z (using value 9): C B A D H In the operations queue for attribute Y, node A is encountered twice during the right-to-left recursion. Thus, when adding the second instance of node A to the operations queue (i.e. the left-most instance), the first instance of node A is cancelled from the operations queue (represented above by striking-through the right-most instance above).

In preferred embodiments of the invention, depth-first compilation is used as it requires fewer internal states to be maintained when the operations queue is evaluated. This is due to most nodes being stateless and their outputs depend only on their inputs and not on any internal node values. Thus in the width-first compilation for attribute Y, execution of the resulting operations queue would require the retention of data values 2 (the result of node B) while the operations represented by nodes C and E are performed in order to then be able to perform the operation represented by node D. In contrast, in the depth-first compilation, data values 2 may be used as soon as they are calculated, and they need not be stored thereafter.

Typically, when compiling a DAG for performing an update operation, many attributes of the object 200 will need to be updated, not just one. The processor 108 may construct an operations queue corresponding to updating multiple attributes by concatenating or merging/interleaving the operations queues that it compiles for each separate one of those multiple attributes. Once again, in doing so the processor 108 removes any duplicate nodes 606 from later in the operations queue since their operations will have already been carried out (or represented) at an earlier stage in the operations queue.

The resulting queue will depend on the order in which the attributes of the object 200 are to be updated. The operations queue for requesting and obtaining updated values for attributes X, Y and Z in turn in a depth-first compilation would then be B A D F C A̶ E B̶ D̶ G G C̶ B̶ A̶ D̶ H, or just B A D F C E G H once duplicates have been removed (as illustrated by the strike-through above).

It should be noted that the formation and execution of an operations queue as described above is merely one example method of carrying out an update process represented by a DAG and that embodiments of the invention may make use of other methods for compiling/executing a DAG. In some embodiments, when executing an update process the processor 108 may not actually generate a queue (or list) with an explicit ordering of operations. For example, the processor 108 may form an (unordered) list by adding elements to a list, each element representing or identifying a corresponding operation/node and having references/links to any operations/nodes that depend on that corresponding operation/node and on which that corresponding operation/node depends. When adding an element to the list, the processor 108 may also store the fact that an element representing the corresponding operation/node has now been added to the list so that if the processor 108 encounters that operation/node again during compilation of the DAG, then it does not add another element to identify that same operation/node to the list, nor does it need to reevaluate the dependencies of that node. This results in an unordered linked list of operations. The processor 108 may execute the update process by a recursive trace analogous to the compilation process: the processor 108 may trace through the list depth-first until an element is encountered which has no further dependencies; the processor 108 may then execute the operation that element references; the processor 108 may then delete that element from the list 108 and then move back along the list to a previously encountered element, and continue to trace depth-first from there until another element is encountered which has no further dependencies, and so on, repeating the above procedure.

The following description shall refer to the generation and execution of operations queues. However, it will be appreciated that the following description applies analogously to embodiments in which the processor 108 is arranged to compile and execute a DAG using any other alternative (non operations queue) method, such as the unordered linked list method described above.

The flexibility in the resolution of node dependencies also allows for any independent sub-graph (i.e. a section of the graph which does not depend on itself) to be evaluated together, i.e. all its nodes appear in sequence in the operations queue. In the example DAG shown in FIG. 7, the processor 108 could separate out nodes A, B, C and E as an independent sub-graph, construct the operations queue for that independent sub-graph, and then evaluate it before the rest of the graph. The resulting queue would then be B A C E followed by D H G F. As this independent sub-graph has no inputs from the rest of the graph (it has no external dependencies), the processor 108 could safely evaluate it (i.e. determine the output data values 1, 2, 3 and 6) before even constructing the operations queue for the rest of the graph.

The group of nodes A, D and G could not form a sub-graph because that group would both depend on, and be depended on by, node E, thereby creating a cyclic dependency.

Data values output from a node 606 need not always depend on all of the data values input to that node 606. Moreover, each output data value may depend on a different combination of the input data values from one execution of the update process to the next. Additionally or alternatively, the graph may represent several modes of operation, and in one or more of these modes some data values are used whilst in other modes those data values are not used. As an example, the graph may have a "switch node" that has two inputs, the first one receiving an on/off flag and the second one receiving a signal that the node passes through and outputs only when the first input receives a value representing "on". If the first input receives a value representing "off" then the output of the switch node no longer depends on the second input. As will be appreciated, there are many more complex ways in which the dependencies between the output data values and the input data values of a node 606 vary depending on the particular input data values.

Thus, when compiling a DAG into an operations queue, preferred embodiments do not construct an operations queue that includes operations which calculate data values that go unused (as otherwise execution of the operations queue would unnecessarily waste processing time and resources). In such embodiments, one or more of the data values (such as the above "on/off" input data value for the switch node) may be identified as being control parameters that affect the internal dependencies between the output data values of a node 606 and the input data values for that node 606. The processor 108, when compiling the DAG into an operations queue, is then arranged to derive all of the control parameters from an independent sub-graph which has no external dependencies. As previously mentioned, the processor 108 may then evaluate this independent sub-graph (to determine the values of the control parameters) before it compiles the rest of the graph into an operations queue for the update process. With all of the control parameters being up-to-date, the processor 108 can use these control parameters to control the path of recursion during compilation of the rest of the graph.

Referring again to the example DAG of FIG. 7, consider the situation in which data value 5 input to nodes G and H represents a control parameter which, when non-zero, completely determines the output from the operations represented by nodes G and H (namely the data values 8 and 9), so it is only when data value 5 is zero that data values 6, and therefore node E, and data values 3, and therefore node C, are required. The processor 108 could pre-evaluate the independent sub-graph A B D to thereby determine the value of the control parameter represented by data value 5. Using the results of this, the processor 108 may then determine the operations queue needed to evaluate the rest of the network, i.e. either C H E G F (if data value 5 is zero) or just H G F (if data value 5 is non-zero).

As discussed below, in preferred embodiments of the invention the user interface 600 uses certain graphical representations, and implements certain tools, to make it easier for the user to construct complex, but flexible graphs that are easy for the user to comprehend (i.e. understand the intended purpose and nature of the animation being represented by the graph displayed in the graph definition area 602). This is described in more detail below. However, it will be appreciated that these features of the user interface are not essential, but merely serve to make the user interface more intuitive and more flexible for the user to construct or design a graph to represent an animation.

The flow of data from one node 606 to another node 606 is preferably not identified using arrows on the connections 608 (although arrows are shown in FIGS. 6 and 7 for ease of explanation). Instead, in preferred embodiments, the inputs and outputs for a node 606 are identified by the convention that input data values are indicated as entering a node 606 on the left side of the node 606 and output data values are indicated as leaving a node 606 on the right side of the node 606. This convention could, of course, be reversed, or even an upwards-downwards relationship could be used instead. Connections 608 between nodes 606 are then illustrated by lines terminated by small circles (the circles representing inputs and outputs for the particular data value or data values being input or output, as shown in FIG. 7). As described later, arrows on lines are used to represent transitions between states in state machines nodes.

The data passed from one node 606 to another node 606 via a connection 608 may, as mentioned above, represent anything of relevance to the animation. In particular, the data may represent one or more of the following, although it will be appreciated that other data representing other aspects of an animation may also be passed by connections 608 between nodes 606:

Data representing values for one or more attributes of the object 200, such as transform data. This may be performed by passing absolute values to represent these one or more attributes (e.g. actual values to specify geometric data) or values to represent how one or more attributes are to change from one time-point to a subsequent time-point (e.g. a trajectory delta to specify how an object's position has changed from one frame to the next frame).

Data representing "time". In most embodiments, time is a value that is passed through unchanged by many nodes 606. A blend node (discussed later) may convert an input time data value from some real-world value (representing an actual time within a game or an application) to an event-space offset (representing a time within a blend operation).

Data representing "events". Events are time-based data associated with animations. They may be used to control the evaluation of the network, or they may be used for unrelated purposes. An example event is a piece of markup data associated with an animation of a person walking or running that identifies when the person's footsteps occur in the animation. These events may be used in a game to trigger sound effects for the footsteps—for example, a computer game may use the events data output from the execution of an update process and the associated operations queue to determine when to output a sound effect for a footstep. As is known in this field of technology, when blending different running/walking/etc. animation sources together, the processor 108 may synchronise the footstep events from the different animation sources so that a smooth blend without undesirable artefacts is achieved. A blend node that represents such a blending operation may also determine and output event data that represents when the footsteps occur in the output blended animation. It will be appreciated that other events, representing other timings of other occurrences in an animation, may be represented by event data passed between nodes 606.

Data representing control parameters (as discussed above).

Data representing values which are not related to object attributes (such as a computation of a trigonometric function).

A node 606 may have one or more input data values that affect its function, but that are static (i.e. they assume the same value for every update process that is performed during the animation). The user interface 600 does not necessarily display such input data values within the graph definition area 602. However, the user interface 600 may display them to the user and/or allow a user to update them within the information area 610, for example when that node 606 has been selected by the user. An example of such an input data value would be a setting on a "blend node" (i.e. a node that blends or merges data from two different animations) to define which type of blend to use (e.g. which data to take from one animation and which data to take from the other animation and how, or in what proportion, these data are to be combined). Another example is discussed with respect to "physics grouper nodes" later.

Figure 9:
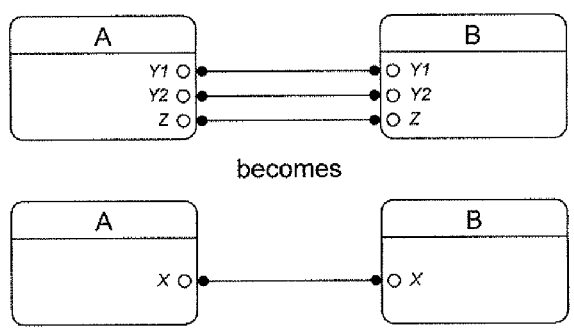
FIG. 9 illustrates how multiple data values, which are always passed together between a source node and a target node, may be illustrated as a single compound data value using the user interface of FIG. 6.

Some data values are part of a group, with the data values in this group always being passed together from a source node 606 to a target node 606. For ease of illustration on the graph definition area 602, the user interface 600 may represent such a group of data values as a single data value rather than representing each data value separately. Hence, a data value output by a node 606 or input to a node 606 may in fact be a single data value or a plurality (e.g. an array or a structure) of data values. This is illustrated in FIG. 9, which shows how three data values Y1, Y2 and Z, which are always passed together between a source node A and a target node B may be illustrated in the graph definition area 602 as a single compound data value X. This frees more space on the graph definition area 602, making it less cluttered and making it easier for the user to understand the graph.

In some embodiments of the invention, the user interface 600 represents, or identifies, the contents of a compound data value by using multiple coloured circles next to the input or output that receives or provides that compound data value. A red circle may be used to indicate that transform data for this object 200 is input/output; a green circle may be used to indicate that time data is input/output; a cyan circle may be used to indicate that event data is input/output. Of course, other data types may be involved in compound data values and other methods of representing the data types involved in compound data values may be used.

The user interface allows compound data values to be separated into subsets of its component data values, so that these subsets can be processed separately. However, preferred embodiments only allow this to happen inside an independent sub-graph of the graph being generated within the graph definition area 602. These embodiments identify this independent sub-graph using a type of "container node" (described below) called a compositor. Compositors isolate the parts of the graph where compound data values are not necessarily in their normal well-defined groupings.

Figure 10:
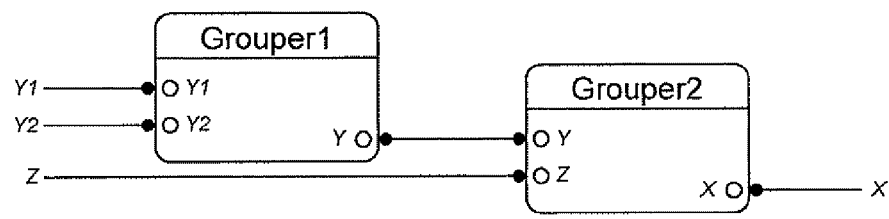
FIG. 10 illustrates a node type called a grouper node which the user interface of FIG. 6 may provide to allow the user to manage compound attributes.

FIG. 10 illustrates a node type called a grouper node which the user interface 600 may provide to allow the user to manage compound attributes. A grouper node groups received input data values and outputs a compound data value that comprises those input data values. Continuing from the example shown in FIG. 9, X is a compound data value containing data values Y and Z, where Y is a compound data value containing data values Y1 and Y2. Two grouper nodes may be used (as shown in FIG. 10) to create the compound data values Y and Z. Preferably, the user interface 600 restricts the placement of grouper nodes to being with the container node representing a compositor—in this way, the normal groupings of data values into a compound data value can be preserved at all places except in compositors where it may be desirable to separate out and operate on specific data values within a compound data value.

Figure 11:
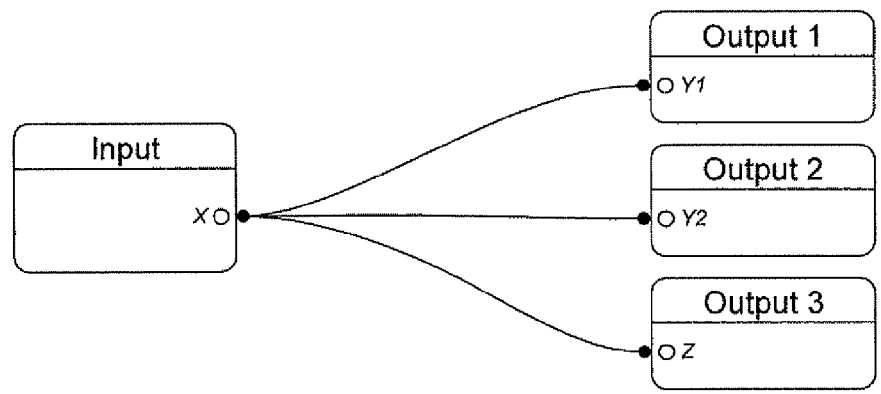
FIG. 11 illustrates the passage of compound attributes between nodes, in the user interface of FIG. 6.

Preferably, grouper nodes have two inputs, which shall be referred to below as a "base" input and an "override" input. The grouper node has settings, i.e. static input data values which may be set by the user (e.g. via input controls that the user interface 600 makes available in the information display area 610 when the grouper node has been selected by the user). These settings identify which specific data value(s) (e.g. object attributes associated with specific joints of the object 200) are to be represented by input data values received at the override input. The base input may receive input data values for any data values (e.g. any object attribute). The grouper node will then group together the data values received at the override input and the base input—if a data value received at the override input represents the same thing as a data value received at the base input (e.g. represent the same body part for the object 200), then the grouper node uses that data value received at the override input to form the output compound data value, and ignores that data value received at the base input, i.e. the override input takes priority over the base input if there is a conflict between the data values received at these two inputs In preferred embodiments of the invention, if the user uses the user interface 600 to connect a compound data value output by a first node 606 to an input of a second node 606 via a connection 608, where that input is only intended for a subset of the data values contained within the compound data value, then the user interface 600 considers that connection 608 to only be passing that subset of data values to the second node 606. Continuing with the examples of FIGS. 9 and 10, FIG. 11 illustrates how a first node may have an output that outputs the compound data value X, and a connection has been made from this output of the first node to inputs of three other nodes that respectively only expect to receive data values Y1, Y2 and Z. The user interface 600 will therefore consider the connections between the first node and these three other nodes to be connections just for the data values Y1, Y2 and Z respectively, despite being connected to an output that outputs the compound data value X.

Figure 12:
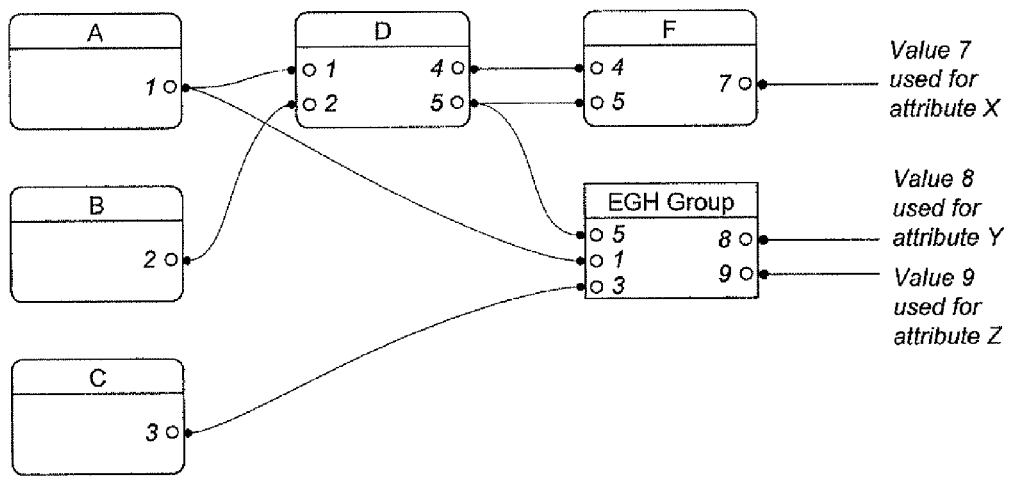
FIG. 12 illustrates the use and operation of a container node in the user interface of FIG. 6.

As mentioned above, a sub-graph is a group of connected nodes which does not depend on itself. In the example DAG of FIG. 7, the group of nodes E, G and H forms a sub-graph. In embodiments of invention, the user interface 600 allows the user to group a sub-graph of nodes together into a single container node, with the single container node replacing the individual nodes of the sub-graph. The user interface 600 displays the container node in the graph definition area 602 instead of the individual nodes that form the sub-graph being represented by the container node. In this way, more space is made available in the graph definition area 602 and a more intuitive and comprehensible graph definition is displayed to the user. This is illustrated in FIG. 12 which illustrates how the user interface 600 allows the user to replace nodes E, G and H with a single container node "EGH Group". Preferably, container nodes are distinguished from non-container nodes by using boxes with sharp corners for container nodes and rounded corners for non-container nodes. It will be appreciated, however, that other methods to visually distinguish between container and non-container nodes may be used.

As mentioned above, the nodes A, D and G cannot form a sub-graph as that sub-graph would both depend on, and be depended on by node E, creating a cyclic dependency. Thus, nodes A, D and G cannot be replaced by a single container node. The user interface 600 does not allow a user to create a container node that would involve such cyclic dependencies.

The user interface 600 may allow a user to edit the contents of a container node (e.g. which nodes form the sub-graph of nodes of the container node and how the nodes of the sub-graph are linked by connections, if any). The user interface 600 may, for example, allow the user to select a container node and double-click on it, or select the container node and press an Enter key on the keyboard 124. In doing so, the current graph (containing the container node) displayed on the graph definition area 602 may be replaced by a graph representing the sub-graph for the container node. This graph may then be edited by the user accordingly, as described above. The user may return to the previous graph by pressing a certain key on the keyboard 124 or selecting a button on the user interface 600 or double-clicking on a location in the graph definition area 602 that does not contain a node 606 or a connection 608. As container nodes may, themselves, contain other container nodes, a hierarchy of levels within the overall graph may be achieved and the user may navigate through the various levels as described above to edit the various graphs and sub-graphs accordingly.

Figure 13:
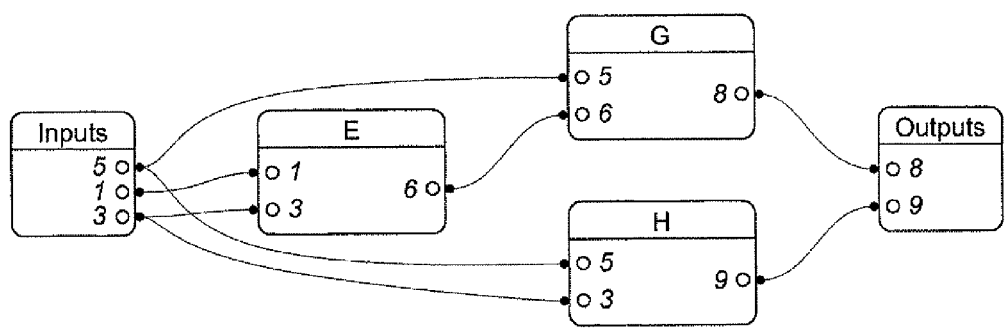
FIG. 13 illustrates the sub-graph for the container node of FIG. 12.

To pass data values into and out of a container node from the rest of the graph, the user interface 600, when displaying the graph for a container node, may display simulation input and output nodes for this purpose. FIG. 13 illustrates an example of this for the "EGH Group" container node of FIG. 12. FIG. 13 shows a sub-graph that may be displayed in the graph definition area 602 when, for example, the user double-clicked on the "EGH Group" node of the graph of FIG. 12 when that graph was displayed in the graph definition area 602.

An input node may be used to make it possible to connect parts of the sub-graph represented by the container node to data values from any other part of the graph without the need to explicitly represent the actual connection 608 to those other parts of the graph (i.e. without having to explicitly show connections to other levels of the graph hierarchy, e.g. the higher level shown in FIG. 12). These data values may just be global inputs with no source node, or may be from a particular node (or nodes) within the graph (but external to the sub-graph).

Figure 14:
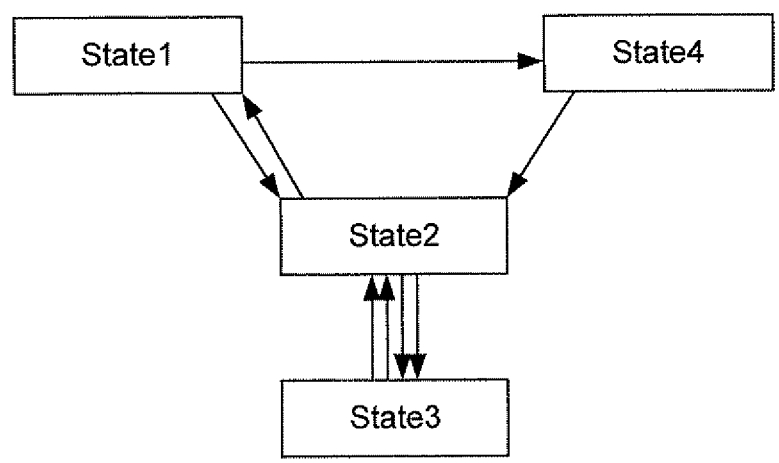
FIG. 14 illustrates the sub-graph of a container representing an example state machine in the user interface of FIG. 6.

One particular type of sub-graph container is a state machine. The nodes of a sub-graph of the state machine container are called "states" or "sister states". Each state is then a container node itself having its own sub-graph of nodes to represent processing for that particular state of the state machine. The state machine container node represents a finite state machine in which only one state may be active at any point in time (except during a transition between states). The sister states contained within the same parent state in a hierarchical state machine all have the same types of output data values. Thus, no matter which state is the currently "active" state for the state machine, the state machine container node will output the same types of data values. The operation represented by a state machine node may involve, during an update process, transitioning from one state (the currently active state) to another state (a newly active state). In preferred embodiments, the possible transitions are represented by arrows between states. These transitions (and their arrows) may be added, deleted and edited in the same way as described above for connections 608. FIG. 14 illustrates the sub-graph of a container representing an example state machine. As shown in FIG. 14, there are four states represented by respective nodes "State 1", "State 2", "State 3" and "State 4". The possible transitions between states are shown using arrows, namely:

for the update process, it is possible to transition from the processing for State 1 to the processing for State 2 or State 4;
for the update process, it is possible to transition from the processing for State 2 to the processing for State 1 or State 3;
for the update process, it is possible to transition from the processing for State 3 to the processing for State 2;
for the update process, it is possible to transition from the processing for State 4 to the processing for State 2.

It will, of course, be appreciated that other state machines, with greater or fewer states, and/or different arrangements of transitions, are possible.

The output from the state machine container node is provided by the output from the currently active state container node of the state machine container node, except possibly during a transition in which case the output from the state machine may be a combination of data from the currently active state to the soon-to-be active state. The currently active state is the state which has been transitioned to most recently (or, on start up, a default initial state).

In FIG. 14, there are two arrows from the State 2 node to the State 3 node. This is used to signify that there are different transitions from the processing for State 2 to the processing for State 3, for example different transitions based on different triggering events or conditions (e.g. triggering events in a computer game). Similarly, there are two arrows from the State 3 node to the State 2 node signifying that there are different transitions from the processing for State 3 to the processing for State 2. It will be appreciated that different numbers of arrows (other than 1 or 2) may be used between two states to indicate a corresponding number of possible transitions between those states.

Figure 15:
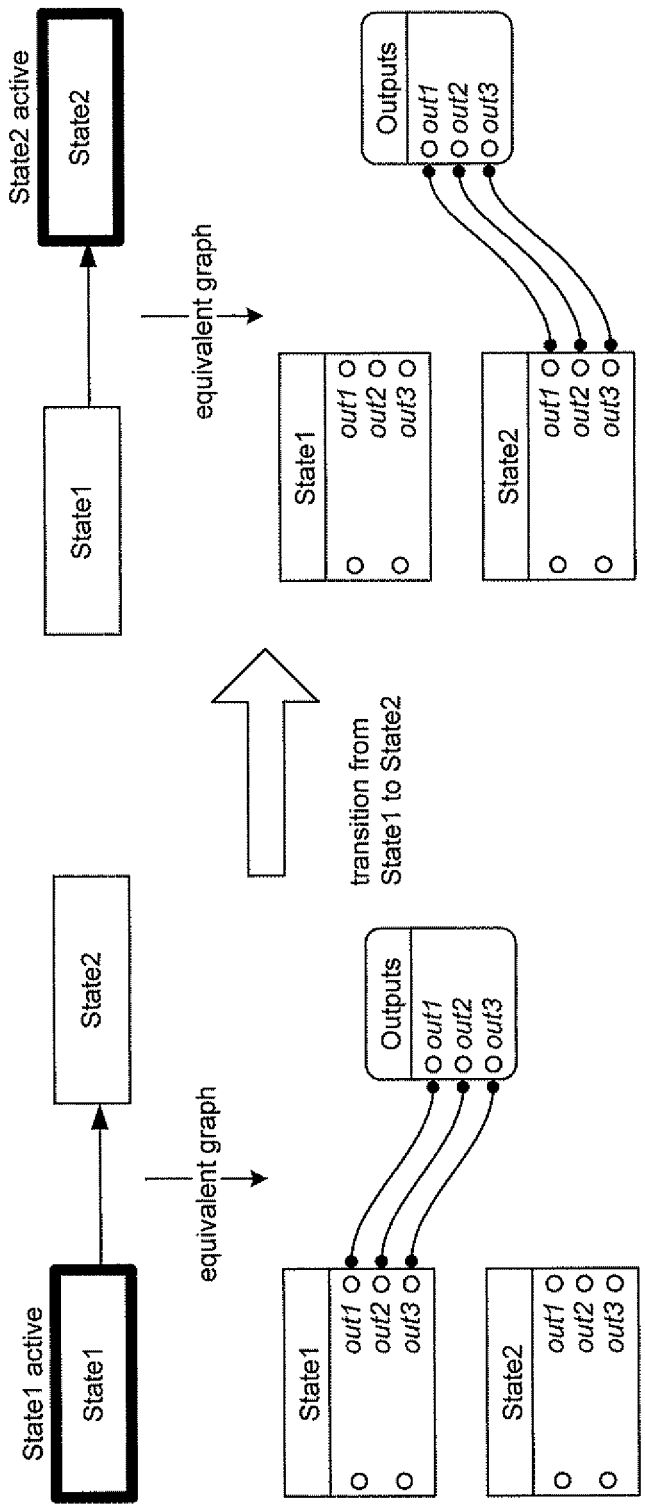
FIG. 15 illustrates an example transition for a state machine.
Figure 16:
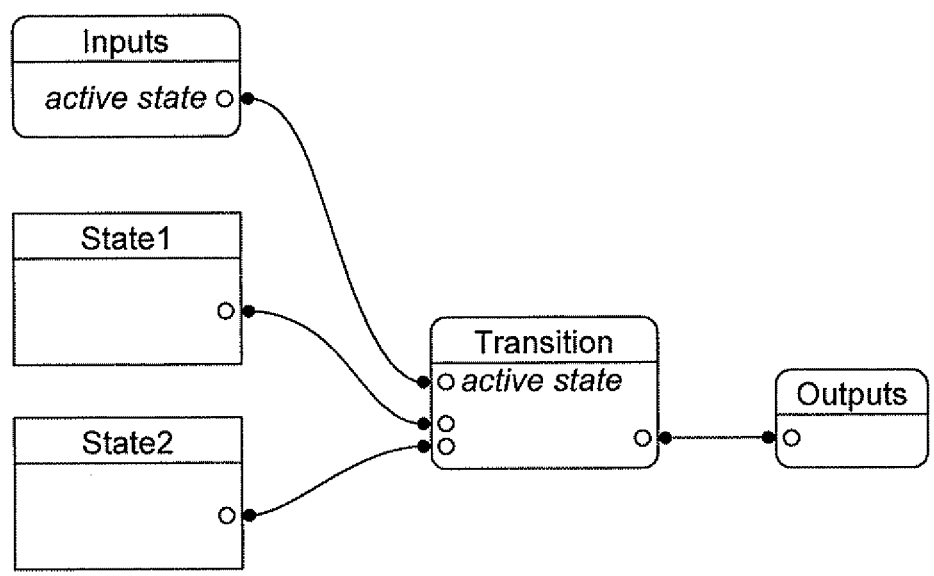
FIG. 16 illustrates the use of a transition node in the transition of FIG. 15.
Figure 17:
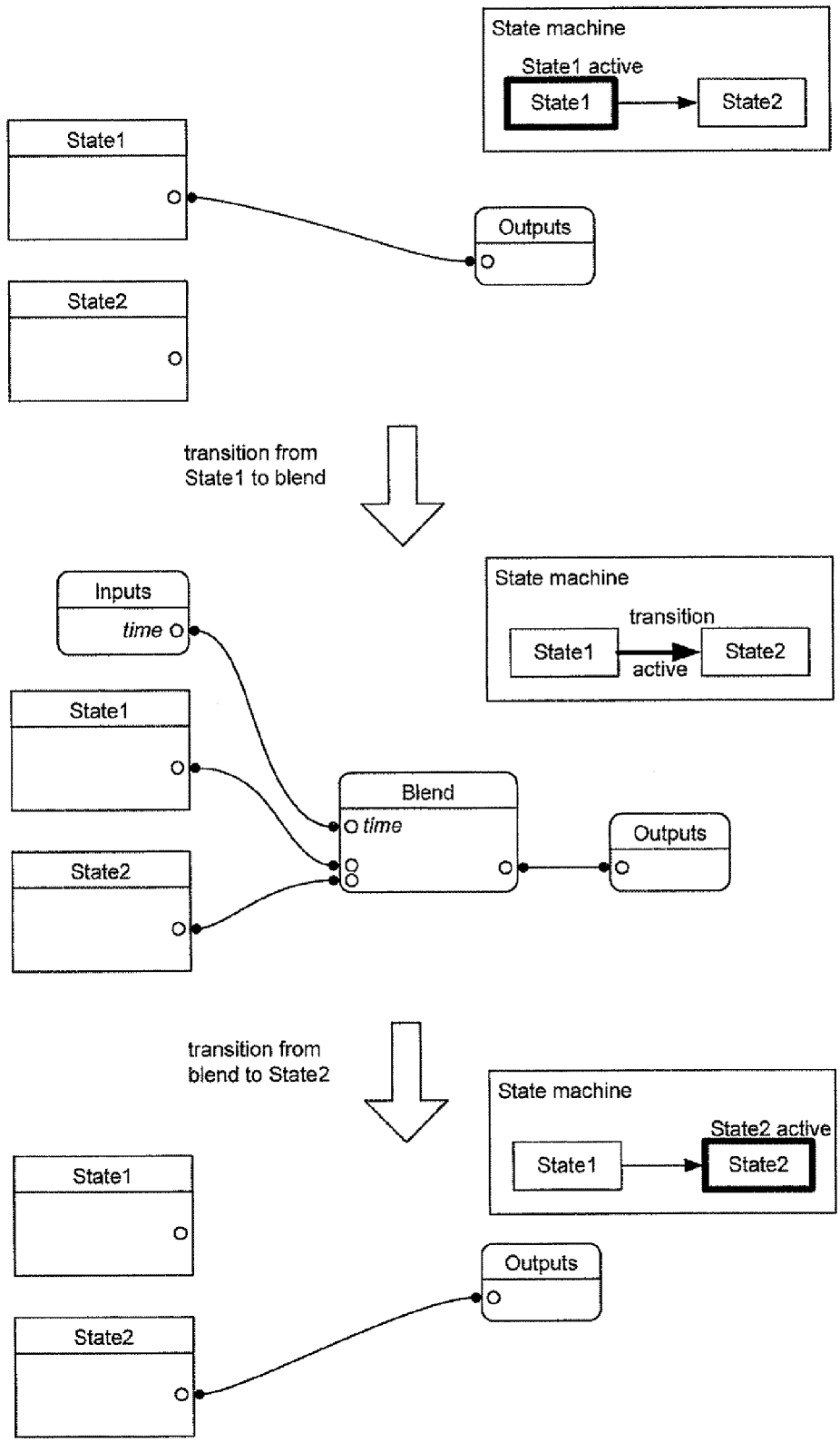
FIG. 17 illustrates another example transition for a state machine.
Figure 18:
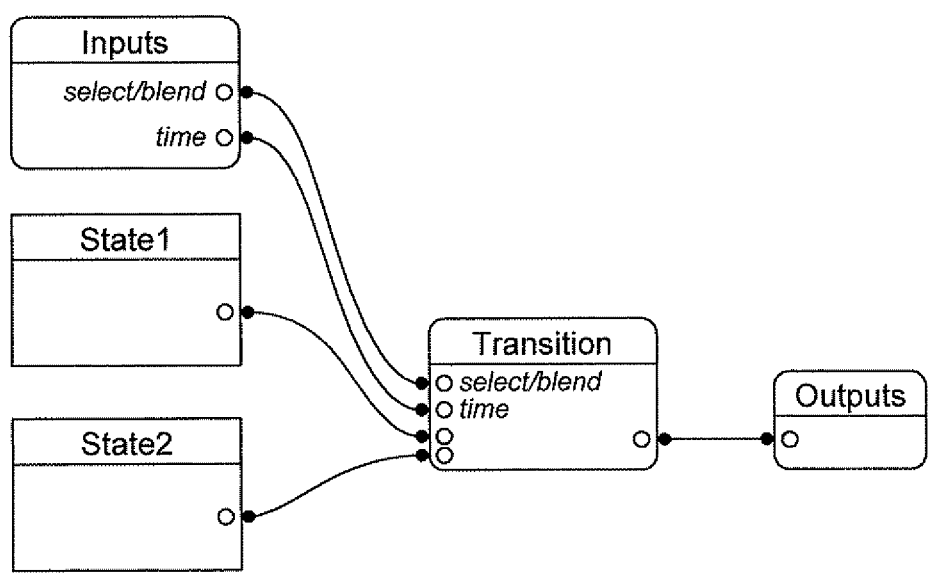
FIG. 18 illustrates the use of a transition node in the transition of FIG. 17.

The user interface 600 may allow the user to specify numerous types of transition (e.g. by selecting a transition arrow and then setting one or more parameters for the selected transition in the information area 610). A first example transition is a "simple" or "instantaneous" transition which is arranged such that, for the update process, the output data values from a currently active state are no longer used (that state then no longer being active) and instead the output data values from another state (which is then active) are used instead as the outputs from the state machine node. This is illustrated in FIG. 15. The user interface 600 could represent this, for example, in graph form by using a transition node within the state machine node, where this transition node effects the switch of active state by passing through data values from one state node or another state node depending on a control parameter that is input to the transition node and that is used to control when to perform the transition, as illustrated in FIG. 16. An alternative example transition type is a "smooth" transition in which a currently active state and a newly active state have their output data values blended over time, for example to transition from running to walking a smooth transition could be used to provide an intermediate stage of jogging for a period of time—in this way, the output data values from a running state node may be combined with the output data values from a walking state node for a period of time. This is illustrated in FIG. 17. Again, the user interface 600 could represent this, for example, in graph form by using a transition node within the state machine node, where this transition node effects the switch of active state by passing through data values from one state node or another state node or a blend of data values from the two state nodes depending on a time data value and a control parameter that are input to the transition node and that are used to control when to perform the transition, as illustrated in FIG. 18. It will be appreciated, of course, that other types of transitions could be used between state nodes within a state machine container node.

In preferred embodiments, some connections 608 may represent a two-way passage of data, in that a connection 608 between a first node 606 and a second node 606 may represent the output of a first set of data values from the first node 606 to be input data values to the second node 606 and, at the same time, to represent the output of a second set of data values from the second node 606 to be input data values of the first node 606. This breaks the "left-to-right" data flow convention mentioned above. Such two-way connections 608 shall be referred to as "functional connections", whilst one-way connections shall be referred to as "data connections". The user interface 600 still represents the functional connection 608 as a line from an output of one node (i.e. from a circle on the right side of a node's block representation) to an input of another node (i.e. to a circle on the left side of that node's block representation)—however, these circles no longer represent purely input or purely output interfaces to their respective nodes. An input or an output of a node 606 that expects to receive a functional connection 608 shall be referred to as a functional input or a functional output.

The use by the user interface 600 of functional connections makes visualisation of the graph within the graph definition area 602 much more simple than if the user interface 600 only made use of data connections, as will become apparent below.

The immediate result of functional connections is that every functional connection appears to create a cyclic dependency (which, as mentioned above, is undesirable), as the two nodes connected to each other via the functional connection appear to be dependent on each other. Embodiments of the invention prevent this by the user interface 600 imposing a number of rules when using functional connections, as follows:

1. A functional output may be connected to only one functional input, i.e. only one functional connection may be connected to a functional output.
2. Every functional node (i.e. a node 606 with a functional output) can have only one output (namely that functional output).
3. The operation represented by a functional node in fact has a separate process for each functional connection, so effectively the functional part of the graph is a definition of multiple independent graphs, consistent and acyclic in themselves, and which can be evaluated independently. In other words, a functional node may represent multiple separate DAG nodes, each one resolving a particular dependency for example, a blend node may represent one operation for blending geometric data, one operation for blending trajectory data, one operation for blending event data; and, for each input animation source for the blend node, a respective operation that uses game time data and an event definition to calculate an event-space time index for that animation source, with all of these operations effectively being implemented as separate DAG nodes.

In most embodiments, time is the only data value that is passed in the "right-to-left" (unconventional) direction across a functional connection 608, but it will be appreciated that other embodiments may additionally or alternatively pass other data values representing other features of the animation in this right-to-left direction.

Figure 19:
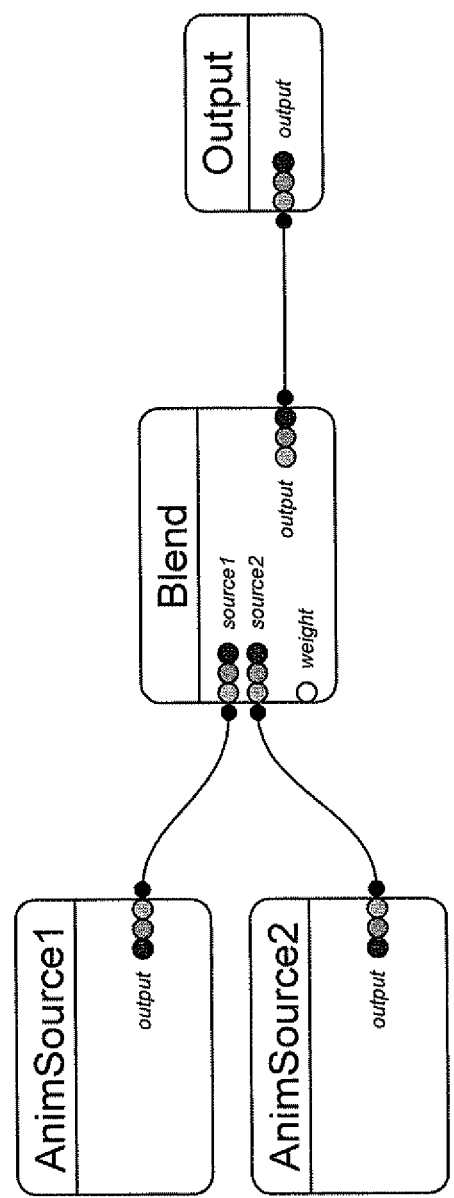
FIG. 19 illustrates the use of functional connections in the user interface of FIG. 6.
Figure 20:
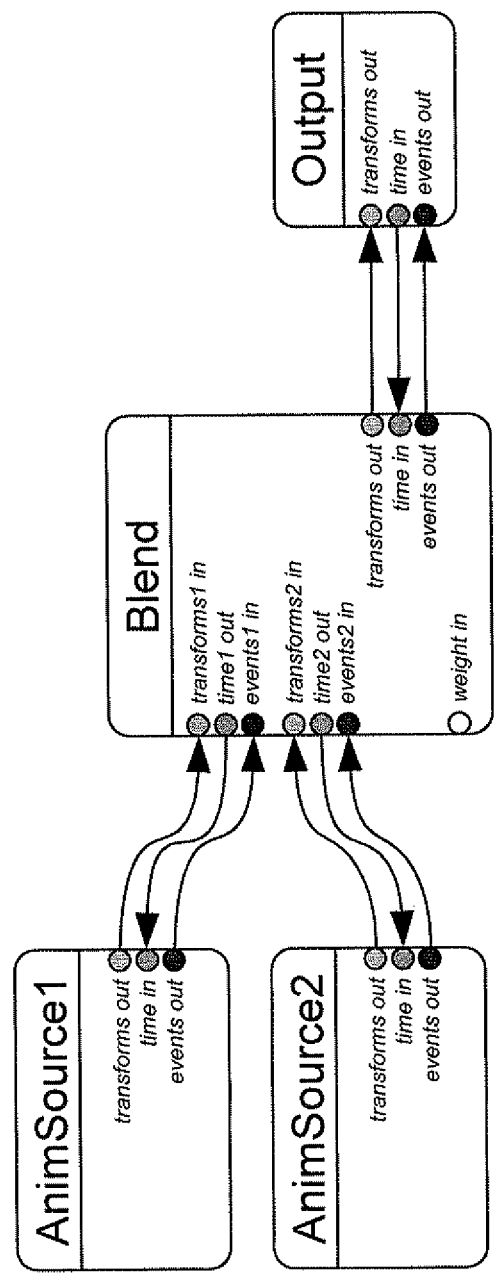
FIG. 20 illustrates how the graph of FIG. 19 might look after its functional inputs and outputs are expanded to expose their underlying components.

The benefit of functional connections 608 is illustrated with reference to FIG. 19, which illustrates the operation of a blend node (used in forming a "blend tree"). The function of these nodes shown in FIG. 19 will be explained later, but in summary, the "AnimSource1" and "AnimSource2" nodes are animation source nodes that represent respective operations that output respective data that define respective poses for the object 200 at a given point time. This data includes transform data (to represent the position and orientation of the object 200 and its parts) as well as event data (to represent events, such as footfalls, that may need to be synchronised when blending transform data from the two animation source nodes together). The "Blend" node represents an operation that interpolates between the two sets of transform data output by the animation nodes depending on the value of a weight control parameter (the control parameter sub-graph is not shown in FIG. 19), and outputs the results to an output node, and, when event data is being used, also represents an operation that interpolates between the respective sets of event data output by the two animation nodes and outputs 7 that result to the output node. For example, the AnimSource1 node may output data representing a person walking whilst the AnimSource2 node may output data representing that person running. The transform data output by these two nodes represents the respective walking and running poses for the person, whilst the event data output by these two nodes represents the respective timing of when footfalls occur during the walking or running. The Blend node may then interpolate, or combine, the transform data from the two animation sources and may interpolate, or combine, the event data from the two animation sources, with the interpolated transform data representing the pose of a person jogging and the interpolated event data representing when footfalls occur during the jogging animation. The weight control parameter sets how the interpolation occurs (e.g. how much the walking data and how much running data contribute to the final output). FIG. 20 shows how this graph might look after the functional inputs and outputs of FIG. 19 are expanded to expose their underlying components. As can be seen, functional connections have been used in order to represent passing time data in the right-to-left direction, with other data being passed in the left-to-right direction.

The way the processor 108 might execute the compilation and dependencies represented by the graph of FIGS. 19 and 20 as follows:

1. The game (or whatever application is using the animation defined by the graph of FIGS. 19 and 20) requests transform data with which to update attributes of the object 200 (e.g. so as to move the object 200 within the virtual world 202). The processor 108 may determined the operations queue to determine an update for the transform data as described below.
2. The update requires evaluation of the transform data output by the blend node.
3. This requires the animation source nodes to output relevant transform data to the blend node for the blend node to interpolate to produce updated transform data.
4. To output transform data, the animation source nodes need an event-space time value in order to know which pose to output from their stored animation data. The animation source nodes can obtain this time data from the blend node (via the functional connections in the right-to-left direction).
5. To calculate this event-space time value, the blend node needs a 'game time' (in seconds, for instance) representing an actual time within the game, as well as the event data representing the event sequences from the animation source nodes. The game time is a direct input to the blend node (supplied by the game itself), while events data is provided to the blend node from the animation source nodes.
6. Consequently, the animation source nodes output their event data to the blend node.
7. The blend node calculates event-space time based on the game time and the received event data, and provides this to the animation source nodes
8. Using the event-space time, the animation source nodes output their respective relevant transform data corresponding to the event-space time.
9. The blend node then blends the respective transform data from the animation source nodes to output blended transform data.

Figure 21:
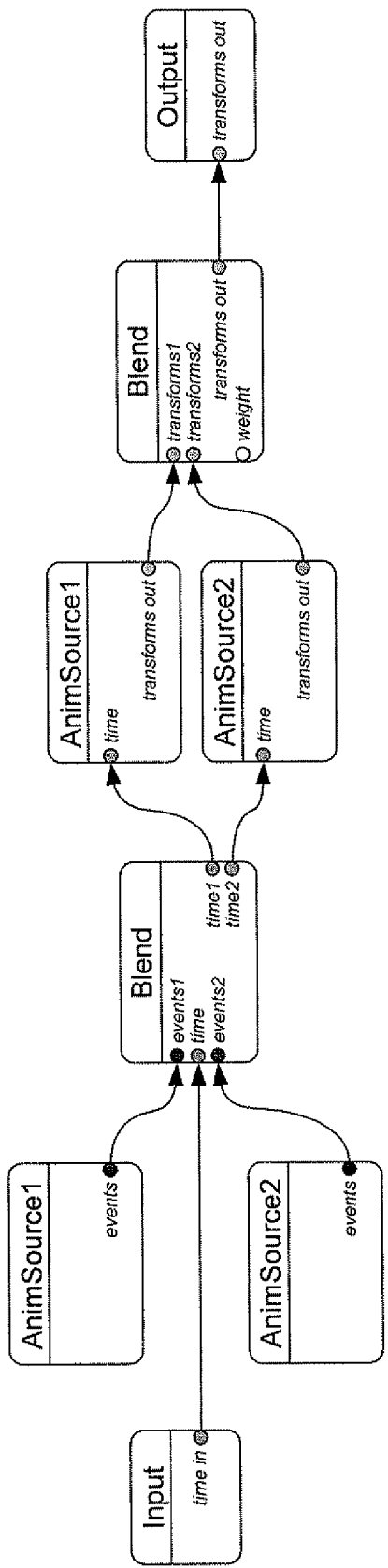
FIG. 21 illustrates the actual directed acyclic graph for the graphs of FIGS. 19 and 20.

FIG. 21 illustrates the actual DAG which the processor 108 determines from the graphs of FIGS. 19 and 20 (based on the above execution sequence)—i.e. it is equivalent to the graph of FIGS. 19 and 20, but with no right-to-left passage of data (i.e. with no functional connections). This is more complex that the graph of FIG. 19 because the graph of FIG. 20 appears to contain cyclic dependencies between nodes (due to the functional connections), whereas the above-mentioned rules mean that a valid DAG (shown in FIG. 21) actually results from the graph of FIG. 19. However, the DAG shown in FIG. 21 is more complex than the graph shown in FIG. 19, and certainly the graph shown in FIG. 19 is more intuitive and comprehensible to the user than the DAG of FIG. 21.

Compilation of the DAG of FIG. 21 according to the usual depth-first dependency resolution rules would construct a valid operations queue for calculating transform data. If the game now requested event data to be output, the resulting compilation would create a different graph consisting of just one blend node taking the events1 and events2 input data, because its inputs have already been updated so it could calculate output events directly.

Figure 22:
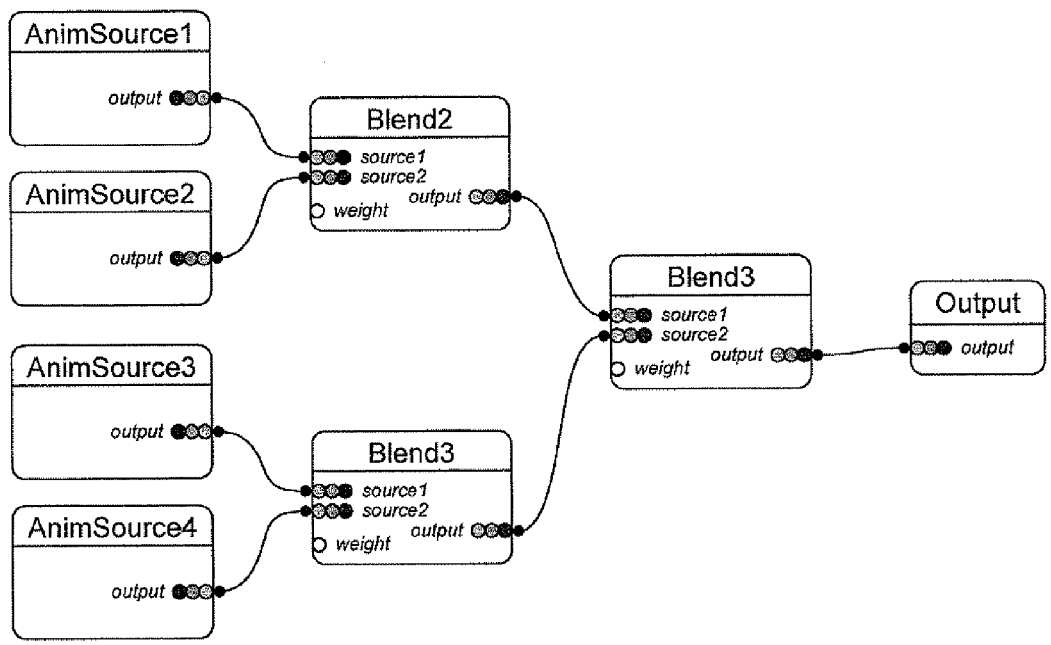
FIG. 22 illustrates an example two-level blend tree.
Figure 23:
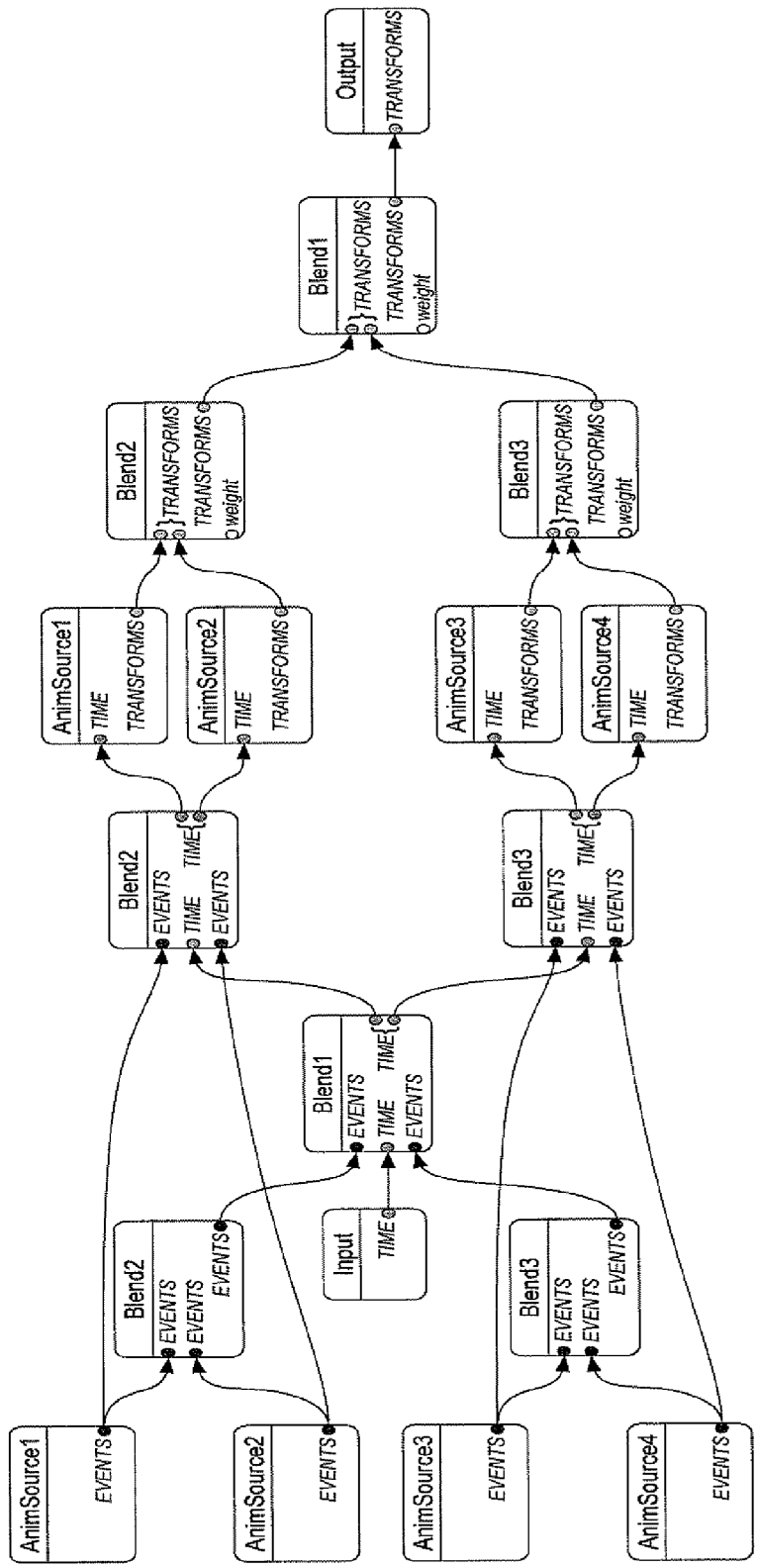
FIG. 23 illustrates the directed acyclic graph corresponding to the graph of FIG. 22.

FIG. 22 illustrates an example two-level blend tree; FIG. 23 illustrates the corresponding DAG for the graph of FIG. 22. This further demonstrates how a user interface 600 according to an embodiment of the invention that makes use of functional connections 608 and the above-mentioned rules allows the user to define more intuitive and comprehensible graphs more easily. A user looking at the DAG of FIG. 23 would find it hard to determine the function of the DAG, and harder to author it in the first place. However the two-level blend tree graph of FIG. 22 which corresponds to the DAG of FIG. 23, by compounding the important attributes and focussing on the left-to-right flow of transform data and event data from animation sources to the output, is a much easier representation to grasp. The true complexity of the flow of time and event data is hidden from the user because the user does not need to know it precisely. Thus, embodiments of the invention 600 allow the user to author a graph in the graph definition area 602 in the more intuitive form shown in FIGS. 19 and 22 as opposed to requiring them to author a DAG (as shown in FIGS. 21 and 23) directly in the graph definition area 602. The above rules imposed by the user interface 600 ensure that a DAG (of FIGS. 21 and 23) can be validly formed from the graph (of FIGS. 19 and 22) created by the user as they ensure that the use of functional connections does not incur cyclic dependencies.

A number of types of nodes shall be described below. However, it will be appreciated that other node types could be used in addition or as alternatives in embodiments of the invention, with other operations being represented by those node types accordingly.

One node type is the so-called "animation source" node type (which has been introduced briefly above with respect to FIGS. 19-23). Animation source nodes are nodes with access to animation data (transform data and event data) that define a particular animation for a particular object 200 (e.g. animation data stored on the storage medium 104). They output transform data for the object 200 for a given time index, i.e. for a given point in time during the animation represented by this animation source node, the animation source node may output transform data to represent the position and orientation of the object 200 and its object parts during the animation at that point in time. The animation data may be stored as time-sampled data and, for a given input arbitrary point in time the animation source node may interpolate appropriately between two or more samples of transform data to generate and output transform data corresponding to that input point in time. Animation source nodes may also output any event data associated with their animation.

Another node type is the so-called "blend" node type which has been introduced at various points above. A blend node represents the interpolation between two or more sets of input transform data (e.g. sets of transform data received from animation source nodes, other blend nodes, or any other nodes in the graph, as shown, for example, in FIGS. 19-23). A blend node may be a "match events blend node" which uses event-space time indexing to ensure that the blending operation always synchronises certain events (such as footfalls for a person object 200) that have been marked up in the input animations. Such match events blend nodes may therefore: (a) obtain event data from animation sources (or other nodes) to determine when events will occur in the animations input to the blend node; and (b) calculate and provide different event-space time data to the animation sources (or the other nodes) to request transform data corresponding to different points in time (i.e. speeding up or slowing down of the input animation sources for the blend node) in order to ensure that events in the animations input to the blend node are always synchronised.

One example event is footstep—the timing of footfalls in two animations to be blended needs to be synchronised or else visually obvious artefacts are produced in the blended result (such as the feet sliding along the ground during a footstep). The use of footstep markup event data ensures this happens even when the two animations to be blended have significantly different timing, such as when blending a "walk" animation with a "limp" animation.

In some embodiments a blend node is arranged to interpolate only between two animations at a time. However, a blend node may have more than two inputs that receive respective animation data for blending and may select different pairs of input animation data depending on a "weight" control parameter input to the blend node. When, for instance, three animation source nodes are connected to a blend node, the blend node blends sources 0 and 1 when the weight control parameter is between 0 and 0.5 and blends sources 1 and 2 when the weight control parameter is between 0.5 and 1. The actual interpolation factor/weighting used for each blend/interpolation may be recalculated from the weight control parameter appropriately (so that it is between 0 and 1).

Another node type is the so-called "IK" or "Inverse Kinematics" node type. IK nodes represent operations for procedural animation which take an input and modify it to provide a modified output. For example, an IK node may be used to adjust the orientation of a joint in an arm or a leg of the human object 200 to bring a hand or a foot into an alignment with a given target position/orientation. This may be used, for example, to allow a game to ensure that the human object 200 reaches to pick up another object accurately or kicks another object accurately (i.e. makes contact with another object in a visually accurate and realistic manner), regardless of where that other object may be in the virtual world 202. As another example, an IK node may be used to adjust spine, neck and head joints for a human object 200 to make sure that the human object 200 appears to be looking towards (and maintains looking towards) a given target or position within the virtual world 202. IK nodes have static data that identify the joints of the object 200 to be modified, and have input control parameters which define the locations of the targets for the desired effect (e.g. making contact with the target or directing an object part towards the target).

Another node type is the so-called "operator" node type. Operator nodes are used for processing control parameters. Examples include adding, subtracting, scaling etc. of various data values. Other mathematical operations can be performed by operator nodes, such as calculating and outputting the sine of an input parameter. This could be used in conjunction with other operators, for example, as a simple way of varying blend weights smoothly back and forth to give a sinusoidally varying output to control, for example, a bobbing "head" or bouncing "tail" of an object 200.

Another node type is the so-called "grouper" node type. This node type has been discussed already above Another node type is the so-called "blend tree" node type. A blend tree is a container node representing a continuously-connected sub-graph. Its sub-graph can contain any node or container type, except for grouper nodes.

Another node type is the so-called "compositor" node type. Compositors are blend trees that can contain a grouper node. Compositors have been discussed above.

Another node type is the so-called "state machine" node type and the so-called "state" node type. These node types have been discussed already above.

Figure 24:
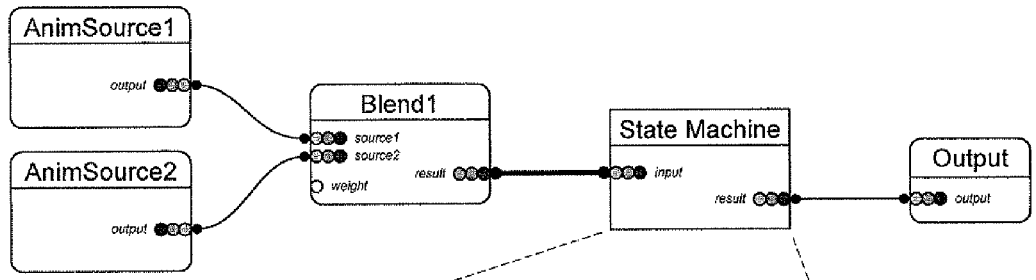
FIG. 24 illustrates an example hierarchical representation of a graph for an update process for an animation.
Figure 24:
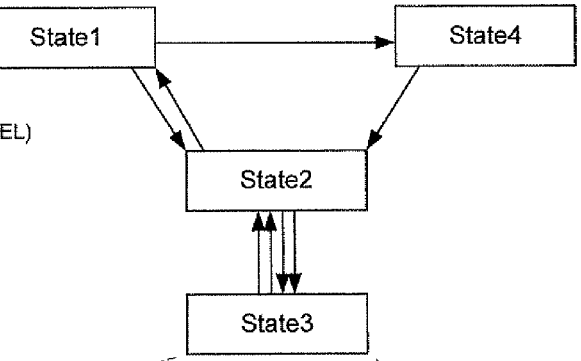
Figure 24:
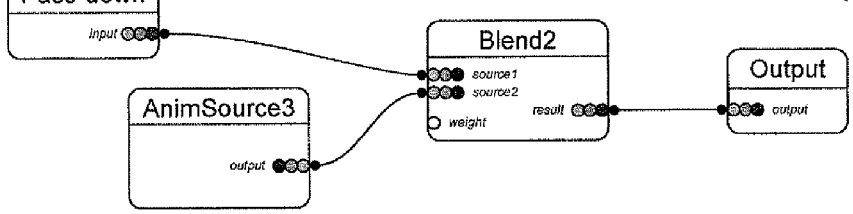

As mentioned above, the use of containers provides a hierarchical structure to the definition of a graph that represents an update process for the animation of an object 200. The sub-graph represented by a container node may itself have one or more further container nodes of one or more types. This applies to all types of container node (be they state machine nodes, states, blend trees, compositors, etc.). An example illustrating such a hierarchical representation of a graph for an update process for an animation is shown in FIG. 24. Navigation between levels of the hierarchy has been described above.

Indeed, the entire graph may be considered to be a hierarchy of state machines (or a hierarchical state machine), wherein each level of the hierarchy is a state machine having one or more states. When there is a single state there are, of course, no transitions. In the example of FIG. 24, the top level of the hierarchy may be considered to be a single state of a top level state machine; the middle level of the hierarchy represents a part of the single state represented by the top level state machine and itself is a state machine having four states; and the bottom level of the hierarchy represents one of the states of the middle level state machine and itself is a state machine having one state.

Figure 25:
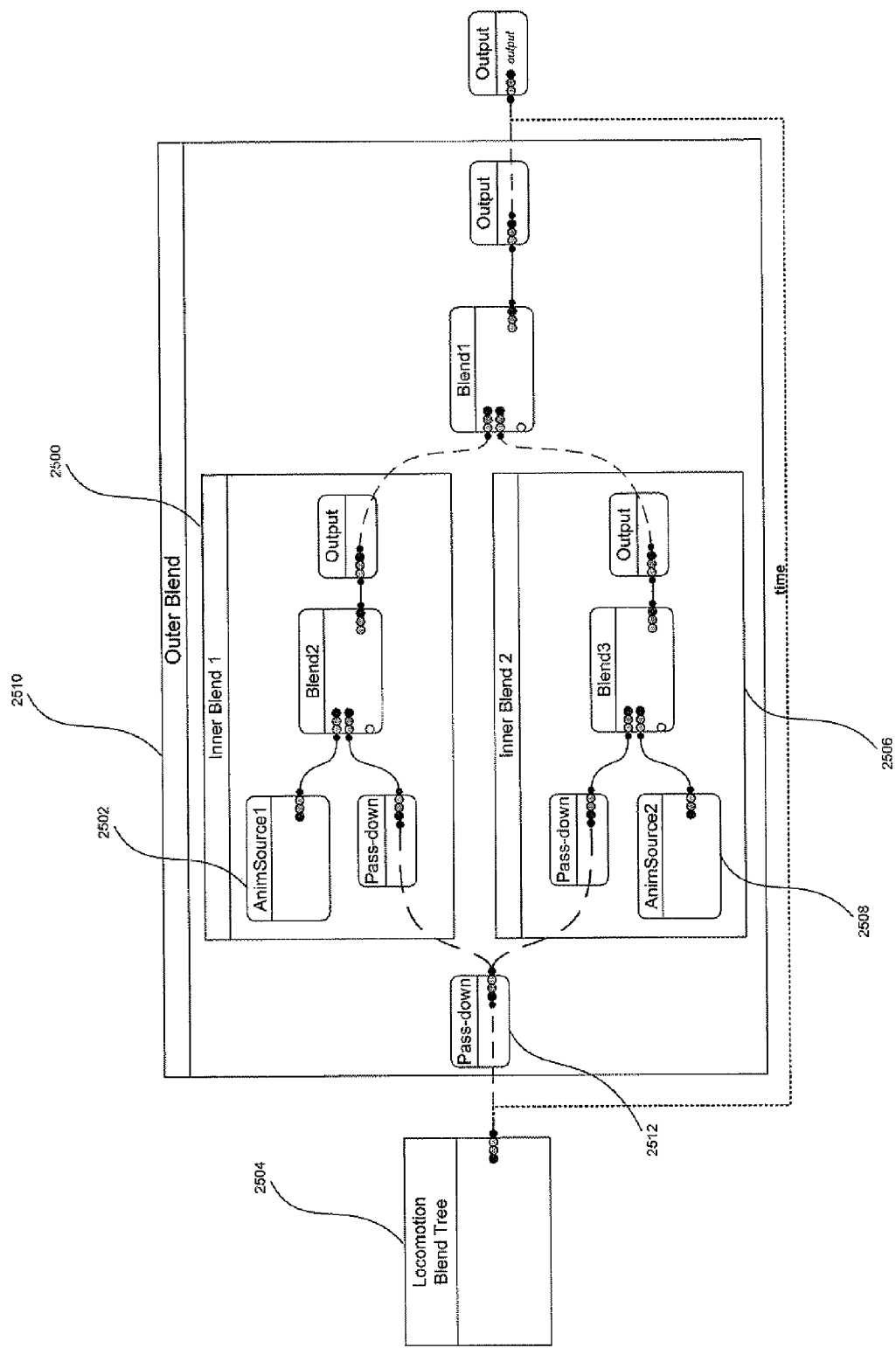
FIG. 25 illustrates an example graph making use of pass-down pins in the user interface of FIG. 6.

Another node type is the so-called "pass-down pin" node type. A pass-down pin represents an input of data into a container node, effectively passing data values down from a higher to a lower editing level within the above-mentioned hierarchy. Pass-down pins are particularly useful in certain situations, as illustrated by the example graph shown in FIG. 25. In the example of FIG. 25, a user has created a two-level blend tree, but has done so using multiple blend tree containers 2510, 2500 and 2506 (the containers 2500 and 2506 being nodes within the container 2510). A first blend is performed by a first inner blend tree container 2500 that blends animation data from a first animation source 2502 with animation data from another a blend tree 2504 labelled "Locomotion". A second blend is performed by a second inner blend tree container 2506 that blends animation data from a second animation source 2508 with animation data from the "Locomotion" blend tree 2504. The outputs of the two inner blend trees 2500 and 2506 are then blended together by the outer blend tree container 2510. The dashed lines in FIG. 25 represent the effective connections being made across containment hierarchy levels by use of pass-down and output nodes. A pass-down pin 2512 of the outer blend tree container 2510 appears to have two functional connections from its output to the nodes of the two inner blend tree containers 2500 and 2506. This would appear to break the above-mentioned rules for using functional connections—in this example, it is not clear which inner blend tree container 2500 or 2506 should pass time data in the right-to-left direction to the Locomotion blend tree container (especially as the inner blend tree container 2500 or 2506 may have modified its input time data). However, embodiments of the invention do not violate the above rules as the user interface 600 may impose a further rule which specifies that right-to-left data (such as time) to be passed via a container node in the graph is not passed through and output from the container via the nodes of the container, but rather is passed directly from the node to which the container node is connected via its own output (in this case, the right-most output node). This is indicated in the graph of FIG. 25 by a dotted-line connection circumventing the outer blend container 2510, marked as 'time'. In this way, data being passed from right-to-left avoid modification by nodes of the sub-graph of the container node, thereby avoiding any ambiguities that might otherwise arise if the nodes of the sub-graph were responsible for actually outputting a value for that data in the right-to-left direction. Thus, the pass-down pin 2512 does not effectively have multiple functional connections linked to its output, as the pass-down pin 2512 does not itself output data in the right-to-left direction. In embodiments of the invention, the user interface 600 makes use of pass-down pin nodes to effect this redirection of right-to-left data to circumvent container nodes. It should be emphasised that the right-to-left (time) data is still provided to the nodes within the container node—but this data is not output from the container node via the nodes within the container node.

As mentioned earlier, embodiments of the invention may make use of many different types of nodes to provide the user a diverse range of nodes representing a diverse range of animation processes with which to define an animation of an object 200. In embodiments of the invention, the user interface 600 makes available, and allows a user to specify that the graph includes one or more nodes in a predetermined category, the predetermined category being associated with a predetermined process, where a node is considered to belong to the predetermined category if performing the respective operation represented by that node requires execution of the predetermined process, and wherein the predetermined process may be executed at most a predetermined number of times at each frame (or other time point being used for the animation processing), or each time the animation update is performed. This may be a predetermined number of times per update per object 200 in the virtual world 202, or may be a predetermined number of times when updating all objects 200 in the virtual world 202.

For example, the predetermined category may represent so-called "physics nodes", wherein a node is a physics node if the operation represented by that node requires the execution of a physics engine. The physics engine is a computer program for execution by the processor 108 that simulates the application of the laws of physics (e.g. Newtonian mechanics) to data values representing some or all of the attributes of some or all of the objects 200 within the virtual world 202. The application of the laws of physics to these data values should be performed once per execution of the update process, as otherwise inconsistencies may arise if the physics engine were to be executed a first time for some of the object attributes and then a second time for those object attributes. This is especially true as a single execution of the physics engine should be performed for all of the objects 200 in the virtual world 202 (or at least those which will be subjected to the simulated laws of physics at the current time-point) as the objects 200 may interact with each other (e.g. collisions)—running the physics engine for one object 200 and then running it again for another object 200 could easily lead to inconsistencies and unrealistic animations and interactions between objects 200 in the virtual world 202. Hence, in the case of physics nodes, the predetermined number of times is 1, or at least once per group of objects that may interact with each other. For example, a computer game may specify one or more groups of objects 200, where the objects 200 in any given group may interact with each other but only with each other (i.e. not with objects 200 in another group), and the physics engine may then be executed at most once when performing an update at a frame for the objects 200 in any particular group. The description below will focus on such physics nodes. However, as will be described later, physics nodes are not the only type of such predetermined category of node, the physics engine is not the only type of predetermined process, and the number 1 is not the only possible predetermined number.

The following are examples of specific physics nodes—however, it will be appreciated that other physics nodes may be implemented in, and provided by, embodiments of the invention:

- A "hard keyframing" physics node may be used when the object 200 (or certain parts of the object 200) must follow input trajectory/input trajectories that the hard keyframing node receives precisely, regardless of the current state of the virtual world 202. The attributes of the object 200 on which the hard keyframing physics node operates are not affected by the state of the virtual world 202, i.e. by other objects 200 in the virtual world 202. A hard keyframing physics node may therefore be used when a target object 200 (or at least certain parts of the object 200) is to be moved in the virtual world 202 in a manner that it may collide with other objects in the virtual world, but that collision should not deviate the target object 200 (or those certain parts) from its course through the virtual world 202—the hard keyframing physics node would ensure that the other objects would be moved out of the way by execution of the physics engine instead of deflecting the movement of the target object 200 (or those certain parts) from the intended trajectory/path received as an input to the hard keyframing physics node.
- A "soft keyframing" physics node may be used when an object 200 is to follow input trajectory/input trajectories that the soft keyframing node receives approximately, and should be allowed to be deflected by the other objects within the virtual world 202. The deflection is calculated by the execution of the physics engine. A soft keyframing physics node has inputs for settings/control parameters that set the strength/balance between following the input trajectory/input trajectories precisely and deflecting upon collision with other objects within the virtual world 202.
- An "active animation" physics node receives as an input a target geometry for the joints of the object 200, representing a desired "pose". The active animation physics node then uses the physics engine to determine how to move the joints of the object 200 so as to achieve the desired pose. This movement is, of course, constrained by the physics data of the object 200 which may specify weights, simulated "muscle strength", joint movement type (e.g. ball-and-socket or hinge) etc., which the physics engine takes into account in order for the active animation physics node to output geometric data that represent realistic movement of the object 200.
- A "ragdoll" node simply ignores any input transform data for the object 200 and causes the joints of the object to move (under the simulated laws of physics as constrained by the physical data for the object 200) to a default pose. This may be used, for example, to collapse a human object 200 from a standing position to one in which the human object 200 has fallen to be lying on the ground (e.g. in a computer game that simulates the human object 200 dying).

Methods for achieving and implementing hard keyframing, soft keyframing, active animation and the ragdoll effect via the execution of a physics engine are well-known and shall therefore not be described in detail herein.

It will be appreciated that a physics node may perform functionality in addition to functionality which requires operation of the physics engine. The additional functionality may, itself, be implemented as one or more separate independent DAG nodes and their interconnections within the physics node, for execution either before or after the execution of the physics engine.

Any container node that contains a physics node inherently becomes a physics node itself, since execution of the operation represented by that container node may involve execution of the physics engine. The word "may" is used here as, for example, a state machine container node could contain physics state nodes and non-physics state nodes and, depending on which state of the state machine is active, execution of the state machine node may or may not involve executing a state node that may or may not require execution of the physics engine. However, the state machine node would still be considered as a physics node, as it has the potential to require execution of the physics engine.

The user interface 600 may visually distinguish between physics nodes and non-physics nodes by using different colours to display the nodes, such as physics nodes in green and non-physics nodes in blue. However, it will be appreciated that embodiments of the invention may use other methods of visually distinguishing between physics nodes and non-physics nodes (e.g. using different shapes, using text, etc.).

As discussed, one way to introduce the operation of the physics engine into a graph, whilst constraining the graph to be structured such that evaluating the graph would require execution of the physics engine at most once, would be to require the user to place at most one (i.e. a single) physics node within the graph. However, this would greatly restrict the type of graphs that the user could design via the user interface 600. An alternative approach may be to specify that physics nodes must be placed at certain positions with the graph definition area relative to other nodes, these certain positions having been calculated to ensure that evaluating the graph would require execution of the physics engine at most once (e.g. only at positions that output final values for object attributes—i.e. at the right-most position within the graph definition area 602). Again, this would greatly restrict the type of graphs that the user could design via the user interface 600.

Therefore, in embodiments of the invention, when the user is designing a graph via the user interface 600, the user interface 600 applies (or imposes or enforces) a predetermined set of one or more rules (or restrictions or conditions) that (a) restrict how the user may specify the structure to ensure that performing the update represented by the graph does not require execution of the physics engine more than once, but (b) do not require the user to specify that any physics node is placed at a particular location within the graph relative to other nodes and (c) do not require the user to explicitly specify which non-physics node's operations need to be performed before execution of the physics engine when performing the update nor which non-physics node's operations need to be performed after execution of the predetermined process when performing the update. Part (a) of these rules ensures that evaluating the graph would require execution of the physics engine at most once, whilst parts (b) and (c) ensure that the user interface 600 provides the user with the greatest flexibility to design the graphs of his/her choice.

One example set of rules applied by the user interface 600 that conform to requirements (a)-(c) above is as follows:

- An non-physics blend tree can only contain non-physics nodes.
- A physics blend tree can contain zero, one or more non-physics nodes, but may itself only contain one physics node.
- A non-physics state machine can only contain non-physics states.
- A physics state machine can contain zero, one or more non-physics states and zero, one or more physics states.
- A physics compositor can contain zero, one or more physics nodes and zero, one or more physics grouper nodes, but these must be arranged such that, for any given data quantity (e.g. an object attribute, time, non-object-attributes, etc.), there is at most one physics node within the physics compositor that operates on a data value for that data quantity, i.e. no two physics nodes within the compositor may operate on data values that represent the same data entity).

It will be appreciated that embodiments of the invention may make use of other forms of rules sets (or methods for expressing rule sets) that conform to requirements (a)-(c) above. For example, the rules may specify that a container node may only comprise a plurality of physics nodes provided that the respective operations represented by those physics nodes do not each operate on data comprising a respective value for a common data entity (e.g. an object attribute) (i.e. there are not two physics nodes within a container node that operate on data for the same data entity). When the graph is viewed as a hierarchical state machine: the one or more rules may specify that the or each state may comprise at most one physics node; or the one or more rules may specify that a state may only comprise a plurality of physics nodes provided that the respective operations represented by those physics nodes do not each operate on data comprising a respective value for a common data entity (e.g. an object attribute) (i.e. there are not two physics nodes within a state that operate on data for the same data entity); or the one or more rules may specify that only one state that operates on data for a data entity may be active when performing the update (i.e. when the graph is compiled and the operations queue is evaluated).

The application of these rules by the user interface 600 ensures that, when the graph defined by the user in the graph definition area 602 is compiled into an operations queue, all of the nodes that require execution of the physics engine can be grouped together as a single block in the operations queue (i.e. without any non-physics nodes being between the physics nodes in the operations queue). Furthermore, these rules ensure that when the physics engine is executed, the physics engine receives as input data at most one data value for, or representing, each object attribute or other data entity to be processed by the physics engine. This ensures that the physics engine receives a self-consistent set of data on which to operate, so that the physics engine can then operate in a well-defined consistent manner without any potential ambiguities. At other points in the graph, there may be multiple operations represented by multiple nodes that produce different possible values for the same object attribute (e.g. when performing a blend between two animations, there will be two data values representing an object attribute, one from each source for the blend). However, as mentioned, the above rules ensure that the physics engine receives as input data at most one data value for each object attribute, ensuring that the virtual world 202 (as represented by the various data defining the objects 200) is in a unique unambiguous state when the physics engine is to be executed.

Figure 26:
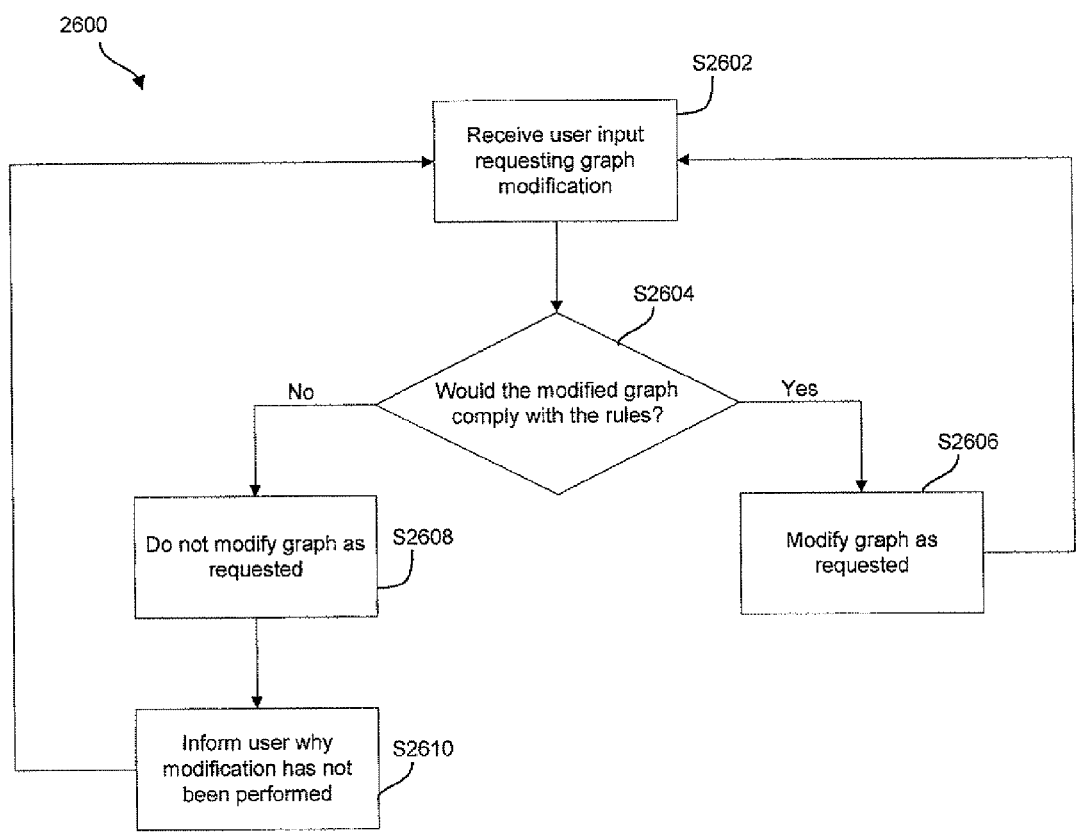
FIG. 26 schematically illustrates a method for performance by a processor in executing the user interface of FIG. 6 to apply the rules in accordance with an embodiment of the invention.

FIG. 26 schematically illustrates a method 2600 for performance by the processor 108 in executing the user interface 600 to apply the above-mentioned rules. This method 2600 is applied each time the user provides input to the computer 102 to request a modification of the graph being authored in the graph definition area 602 (be that by addition, movement, deletion, etc. of nodes 606 or connections 608).

At a step S2602, the user interface 600 waits for, and then receives, an input from the user requesting a modification of the graph.

At a step S2604, the user interface 600 checks whether the requested modification would form an updated graph that still satisfies the above set of rules that are to be applied. If the requested modification would form an updated graph that still satisfies the above set of rules that are to be applied, then processing continues at a step S2606 at which the requested modification is applied by the user interface 600, with the modified graph then being displayed in the graph definition area 602 accordingly. Processing then returns to the step S2602.

However, if the requested modification would form an updated graph that does not satisfy the above set of rules that are to be applied, then processing continues at a step S2608 at which the requested modification is not applied by the user interface 600. Then, at a step S2610, the user interface informs the user that the modification has not been implemented and, preferably, the reasons for this (in particular, the particular rule or rules which would no longer be satisfied). This may be achieved, for example, by displaying a report in a message box on the monitor 120 or in the information area 610 of the user interface 600. Processing then returns to the step S2602.

As mentioned above, the application of the above rules ensures that, when compiling the defined graph into an operations queue, all of the nodes that represent an operation which requires execution of the physics engine can be grouped together as a single block in the operations queue. The processor 108 may perform this compilation into a suitable operations queue as follows:

1. The processor 108 first evaluates the control parameter sub-graph (if any) to decide on which nodes should or should not be included in the operations queue, as has been described above.
2. The processor 108 then begins to fill the operations queue by recursing through the remainder of the graph based on the dependencies defined in the graph for the required outputs. The processor 108 does this in the normal depth-first manner as has been described above. The processor 108 continues doing this until a physics node is encountered.
3. The processor 108 does not add the physics node to the operations queue yet. Instead, the processor 108 changes from using depth-wise compilation to using width-wise compilation to add further nodes to the operations queue in a width-wise direction—and each time a physics node is encountered, it is not added to the operations queue. This results in a "post-physics" operations queue representing all the operations that can be performed during an update after the physics engine has been executed.
4. The processor 108 then compiles the remainder of the graph in the normal way (using depth-wise compilation), to form an operations queue for updating all of the inputs to the physics nodes that are required for this update. This produces a second, "pre-physics" operations queue representing all the operations that should be performed during an update before the physics engine has been executed.

5. The processor 108 then concatenates the post-physics queues for each attribute for each object 200 in the virtual world 202 that needs to be updated into a single post-physics operations queue for the whole animation of the virtual world 202. The processor 108 also concatenates the pre-physics queues for each attribute for each object 200 in the virtual world 202 that needs to be updated into a single pre-physics operations queue for the whole animation of the virtual world 202.

6. The processor 108 may then execute the final pre-physics queue, then execute the physics engine to carry out the various functionality of the various physics nodes, and then execute the final post-physics queue.

Figure 27A:
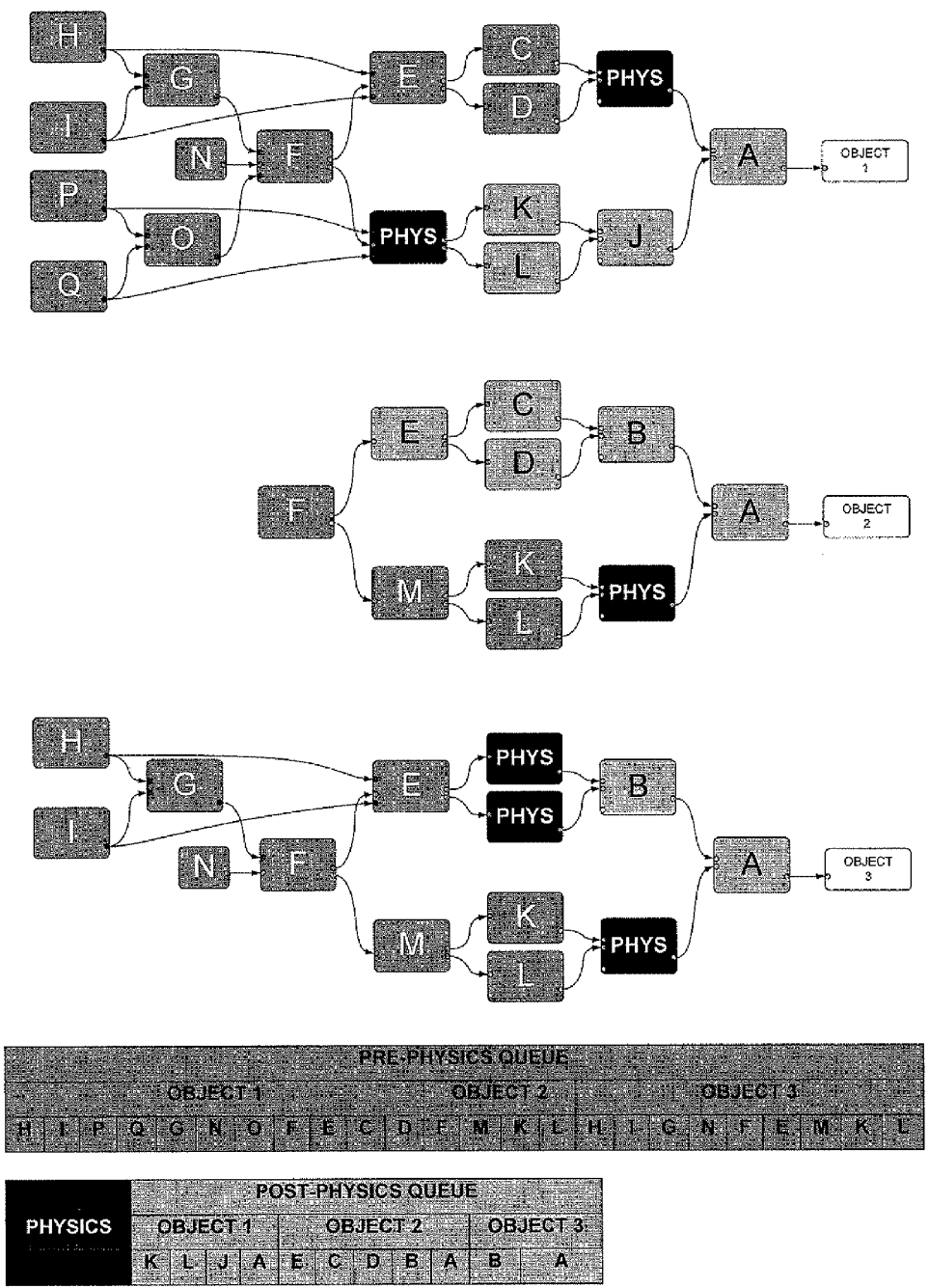
FIG. 27a illustrates three example graphs for three different objects, expanded into their directed acyclic graph form, together with a combined operations queue formed for them.

FIG. 27a illustrates three example graphs for three different objects, expanded into their DAG form, together with the combined operations queue for them formed using the above method. In practice, when executing the operations queue, the computer program (such as a computer game) may perform an update process for the objects 200 within the virtual world 202 as follows: (a) the update process may execute the pre-physics queue and then inform the controlling program that it is now time to execute the physics engine (based on the outputs of the execution of the pre-physics queue); (b) the update process may then temporarily exit to allow the computer program to execute the physics engine accordingly; (c) then the update process will resume or be resumed so that it can execute the post-physics operations queue. Step (a) above may be performed for each of the objects 200 in the world 202, with step (b) then being performed, following by step (c) being performed for each of the objects 200 in the world 202.

Figure 27B:
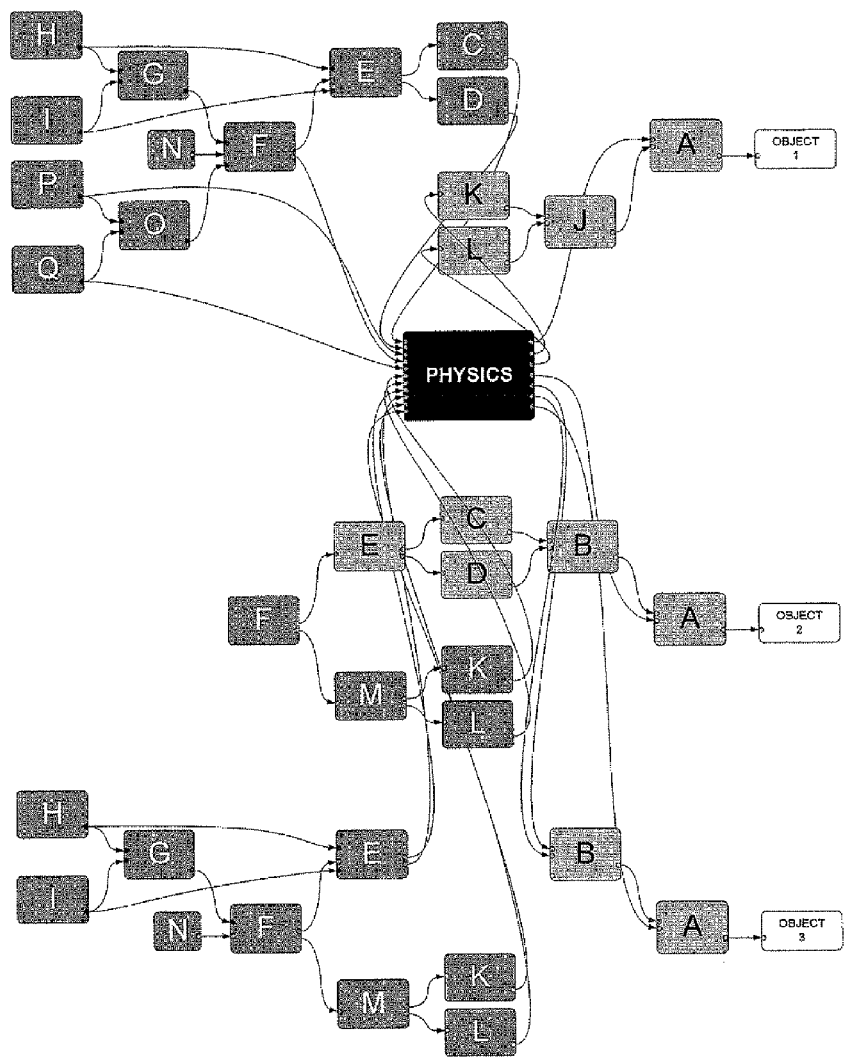
FIG. 27b illustrates the same three example graphs for the three different objects of FIG. 27a, but in which the physics nodes are shown as representing "interfaces" or sub-parts of a single physics node used by all of the objects.

In some embodiments of the invention, the physics nodes shown in the graph definition area 602 are, in fact, representations of a single physics node of the final DAG. This single physics node may be considered to be a physics node that is global across multiple objects 200 and their respective graphs. The physics nodes shown in the graph definition area 602 (and which the user places and edits/moves/connects-up etc. within the user interface 600) then represent interfaces to, or sub-parts of, that single physics node. In other words, the physics nodes shown in the graph definition area 602 represent multiple references, at corresponding different points in the graphs, to a common single physics node—i.e. the common single physics node may be considered as being represented as having been split (visually in the user interface 600) into multiple separate sub-parts, namely the individual physics nodes which the user has added via the user interface 600. These sub-part representations each receive as an input a respective subset of the full set of data values which the physics engine uses as part of its processing (e.g. a first physics node may represent the physics engine receiving torso transform data for a first object 200, whilst a second physics node may represent the physics engine receiving legs transform data for that first object 200, whilst a third physics node may represent the physics engine receiving transform data for a second object 200). These sub-part representations also each represent the respective physics processing to be performed on the respective subsets of data values. The above-mentioned set of rules, that are applied by the user interface 600 when allowing or disallowing the user to manipulate graphs with physics nodes, ensure that these interfaces to, or sub-parts of, the single physics node provide the single physics node with a consistent set of data, i.e. the single physics node does not receive conflicting input data values representing the same data entity (such as an object attribute), i.e. for each data entity required by the physics engine, the physics engine is supplied with a unique value for that data entity. As an illustration of this, FIG. 27b illustrates the same three example graphs for the three different objects of FIG. 27a, but in which the physics nodes specified by the user via the user interface 600 are shown as representing "interfaces" or sub-parts of a single physics node used by all of the objects. In embodiments that make use of this representation of a single/global physics node, the processor may compile the graphs for the various objects 200 using the usual depth-first compilation—when a physics node is encountered for the first time during this compilation, then the compilation of the graph continues by updating the operations queue based on all of the possible dependencies for the single/global physics node (which the encountered physics node represents an interface, or sub-part, of). The depth-first compilation then continues as normal.

For physics state machines, a transition between two physics states may represent a conflict as both active states may each contain physics nodes that act on the data values for a common object attribute—consequently, the physics engine will not have an unambiguous set of input values on which to operate. Effectively, both physics states would require their own separate execution of the physics engine which, as discussed, should not be allowed. Embodiments of the invention may address this when performing a transition by executing, for the currently active (source) physics state, an alternative operation that acts on the input data to that physics state without requiring the execution of the physics engine, instead of executing the physics engine with the operation normally represented by that physics state as would normally happen. This operation may simply be an approximation of what the physics engine would do. For example, the replacement operation could be a so-called "dead-reckoning" operation, in which joints are rotated at a constant angular velocity (which may be their current respective angular velocities) until they reach their limits, and the object root joint(s) is/are moved at fixed linear and angular velocities (which may be their current respective linear and angular velocities) within the virtual world 202. Alternatively, this replacement operation may simply provide an output using the previously output data values from the source physics state.

Thus, in embodiments of the invention, the user interface 600 may allow a user to define a graph or an animation by specifying that, for a transition from a first state to a second state of a state machine during which both the first state and the second state are active (i.e. are to process and output data)—for example, as shown in FIGS. 17 and 18—then execution of the physics engine by the respective operations represented by the physics nodes of the first state or of the second state is replaced by execution of an alternative process not involving the physics engine. This alternative process may be an approximation of the physics engine processing.

Figure 28:
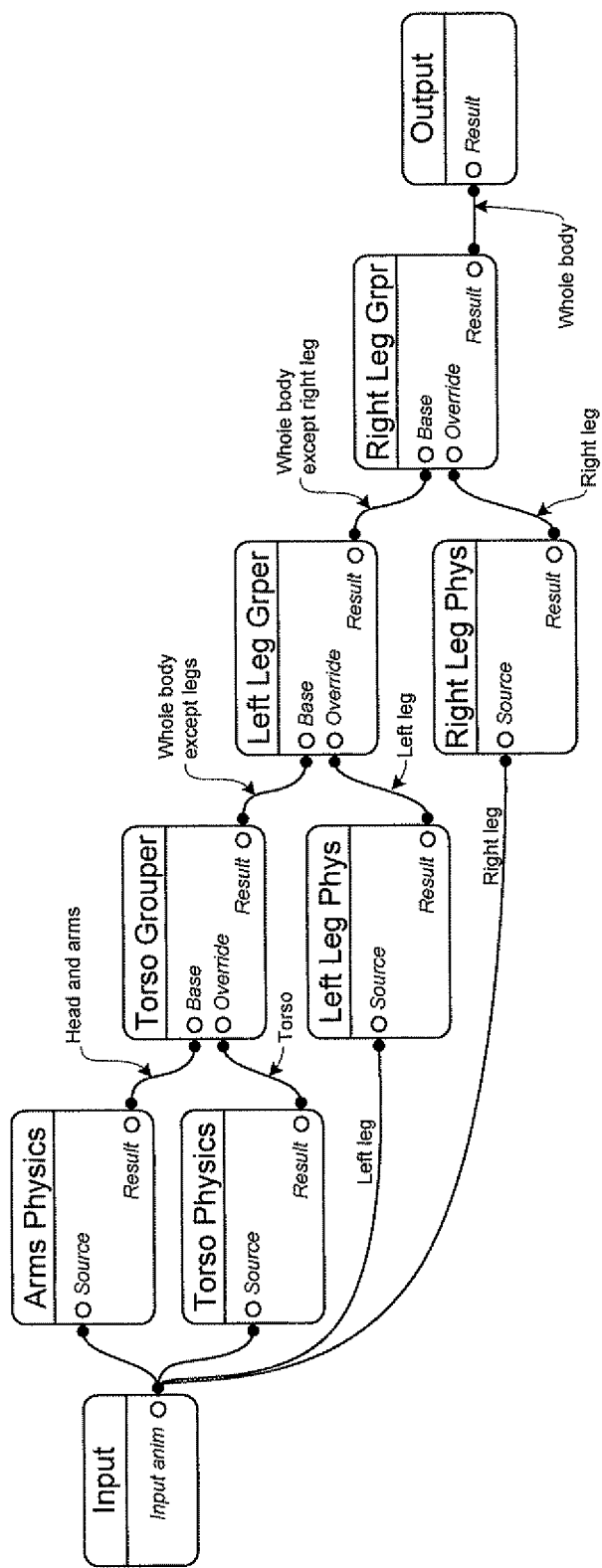
FIG. 28 illustrates an example of how physics nodes may be used within a compositor physics node to act on different parts of an object.

FIG. 28 illustrates an example of how physics nodes may be used within a compositor physics node to act on different parts of an object 200, with the use of grouper nodes to combine the results. In particular, the compositor provides the input data values to four separate physics nodes which act, respectively, on the arms, the torso, the left leg and the right leg of an object 200. A series of grouper nodes are then use to sequentially combine outputs from the physics nodes: first the output from the arms and torso physics nodes are combined into a compound data value by passing the data from the arms physics node to the base input of a first grouper node and the data from the torso physics node to the override input of that first grouper node; then the output from the first grouper node and the left leg physics node are combined into a compound data value by passing the data from the first grouper node to the base input of a second grouper node and the data from the left leg physics node to the override input of that second grouper node; and then the output from the second grouper node and the right leg physics node are combined into a compound data value (representing the whole object 200) by passing the data from the second grouper node to the base input of a third grouper node and the data from the right leg physics node to the override input of that third grouper node. The processing of the physics nodes may, for example be: active animation on the arms of the object 200 to force them to move into a particular pose; ragdoll on the torso to make the torso of the object 200 go limp; soft keyframing on the left leg of the object 200; and hard keyframing on the right leg of the object 200. Thus, it can be seen that embodiments of the invention allow the user to specify different physics processing on different sets of data values, providing a very flexible graph design. It will be appreciated, of course, that a physics compositor node may make use of different numbers of, and different types of, physics nodes, with grouper nodes being used within the compositor node as appropriate to re-assemble the various data values back into the expected compound data value (i.e. of the type received at the input to the compositor node).

Figure 29:
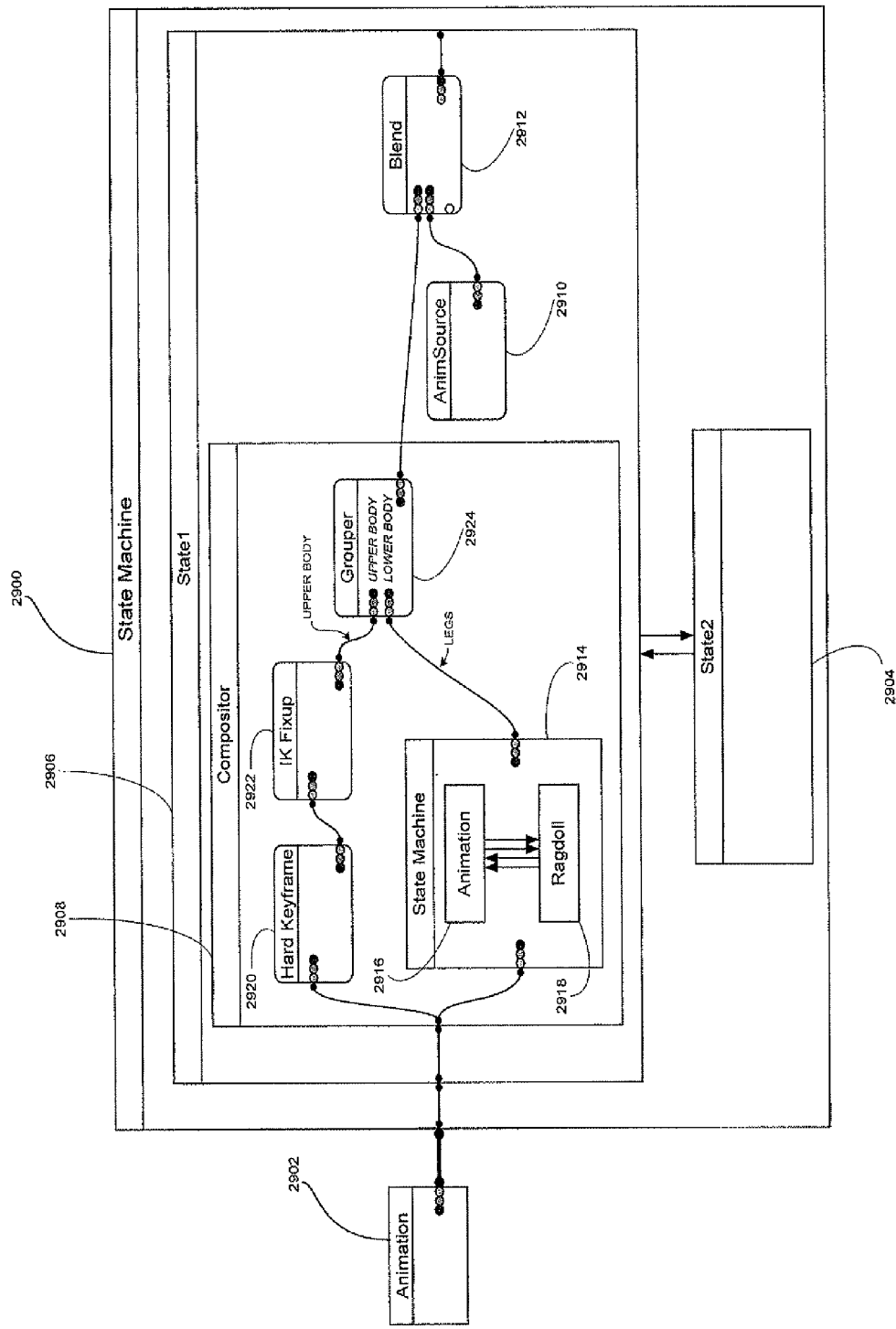
FIG. 29 illustrates a complex graph that previous graph definition tools have not been able to implement, but which can be implemented by the user interface of FIG. 6.

FIG. 29 illustrates a complex graph that previous graph definition tools have not been able to implement. Embodiments of the invention allow the user to author such a complex graph due to the above-described techniques. For ease of illustration, input, output, and pass-down pin nodes have been illustrated simply by direct connections across the boundaries between container nodes. In particular, the graph of FIG. 29 comprises a state machine 2900 that receives input from some other animation 2902. The state machine comprises two states 2904, 2906. The first state 2904 is, in this example, a physics state performing some form of operation on the input from the animation 2902 using the physics engine. The second state 2906 is shown in more detail, and is also a physics state. The second state 2906 comprises a compositor node 2908, whose output is blended with the output of an animation source 2910 via the use of a blend node 2912. Inside the compositor node 2908, the upper body of the human object 200 is processed separately from the legs of the human object 200. In particular, the processing for the legs of the human object 200 is provided via a second state machine node 2914 which comprises a first non-physics animation state 2916 (which could represent the object 200 walking) and a physics state 2918 (in this case performing a ragdoll effect on the legs of the object 200). For the upper body of the object 200, a hard keyframing physics node 2920 acts on the upper body (e.g. if the human object 200 is wielding a staff, then the user may wish other objects around the upper body to be moved out of the way of the upper body without deflecting the upper body). Additionally, after the hard keyframing physics node 2920, an IK node 2922 acts on the upper body (e.g. to ensure that the hands of the object 200 properly hold the staff). A grouper node 2924 then re-groups the data values for the upper body and the legs.

As mentioned, pass down-pins are not shown in FIG. 29 for ease of illustration. However, as discussed above, they facilitate passing of time data from the right to the left of the frame (i.e. in the direction opposite to the normal user reading of the graph)—in particular, time data will not be output to the animation 2902 from the hard keyframing node 2920 or the state machine node 2914 within the compositor node 2910; instead, the animation 2902 will receive time data from the blend node 2912 (as this is the node connected to the output of the compositor 2910). Additionally, the transition or switching between the two physics states of the state machine node 2900, which may both seem to require the operation of the physics engine in parallel, may be handled as described above (e.g. using dead reckoning approximation). It is also worth noting that the graph of FIG. 29 illustrates how the user can perform physics processing on some parts of the object 200 and then perform non-physics processing on those parts before combining the result of other physics processing on other parts of the object 200.

It is clear from the graph of FIG. 29 what the intended function of the graph is. Thus, it is clear that the user interface 600, in applying the various above-mentioned features, provides a very intuitive yet flexible approach to designing graphs for animations when those animations are to involve the use of a physics engine.

As mentioned above, physics nodes are not the only predetermined category of nodes, where the predetermined category is associated with a predetermined process, where a node belongs to the predetermined category if performing the respective operation represented by that node requires execution of the predetermined process, wherein the predetermined process may be executed at most a predetermined number of times each time the animation update is performed. There may be other reasons why a particular predetermined process should be executed at most a predetermined number of times per update. This could be, for example, that execution of the predetermined process takes a significant amount of time or requires a significant amount of computation resources (such as memory), and therefore the number of times that predetermined process should be performed per update should be limited to ensure that the processor 108, when executing an animation, can smoothly output an animation to the user. Additionally, or alternatively, the predetermined process may involve operating on multiple objects 200 within the virtual world 202 at the same time, and therefore it would be desirable to have a limited number of instances that the predetermined process is performed (e.g. just once) per update so as to ensure that all objects 200 are controlled in a consistent manner. Thus, the terminology "physics node" and "physics engine" used above is purely exemplary and should not be considered as limiting.

As a further example, most games implement a so-called "character controller" process for each object 200. The character controller for an object 200 may internally represent the object 200 as a more simple object/shape/volume, such as a capsule or sphere, that is located at the current location of the object 200 (as represented by the trajectory joint 404). The character controller may then use this simplified object shape to prevent the object 200 from interpenetrating other objects in the world 202, such as preventing a human object 200 from running through walls. A character controller node could be used within a graph for an object 200—the character controller node would detect the collision of the object 200 with another object and, if such a collision has occurred, it could take an appropriate action, such as (a) disregard an input trajectory delta for the object 200 to stop the object 200 moving within the virtual world 202; or (b) adjusting values for the transform data to simulate a suitable collision—this could even involve the use of the physics engine, e.g. the implementation of a ragdoll effect to simulate the object 200 falling over (this particular node would then be both a character controller node and a physics node). It will be appreciated that when the game involves multiple objects 200 being animated within a virtual world 202, then the movement of one object 200 may have an impact on the movement of other objects 200—i.e. the movements of the object 200 within the virtual world may be inter-dependent. Thus, it would be desirable to execute all of the character controller logic for all of the objects 200 as a single operation—in this way, the game can determine how best the objects 200 can interact. For example, the character controller logic could force two objects 200 to "agree" to avoid each other as they are being moved towards each other on a collision course. Similarly, two objects 200 involved in an animation of a sword fight may need a centralised decision from character controller logic about how they will move their arms (and hence the swords) in order to output a realistic sword fight in which the objects 200 are responding to each other. Hence, this kind of character controller operation may itself form a predetermined character controller category of node, having associated with it the predetermined operation of the character controller logic, which is to be executed once per update of all of the objects 200 in the virtual world 202. It will be appreciated, then, that the rules similar (or the same) to those described above for the physics nodes may be applied by the user interface 600 analogously for character controller nodes.

Moreover, the predetermined number of times that the predetermined process may be performed each time the animation update is performed or at each time point (e.g. output video frame) may be more than 1. For example, the physics engine may be executed multiple times per update of a single object 200—once for performing fluid dynamics physics simulations and calculations, once for performing rigid body physics processing, etc. Additionally, or alternatively, the controlling computer program (e.g. the computer game executing the animations) may split the objects 200 into separate groups of objects 200, where the objects 200 in one group will never interact with or influence the objects 200 in another group. The computer program, when updating the virtual world 202 and all of the objects 200 therein, may then execute the physics engine once for each group of objects 200, which would result in the physics engine actually being executed multiple times per update.

It will be appreciated that embodiments of the invention may be implemented using a variety of different information processing systems. In particular, although FIG. 1 and the discussion thereof provide an exemplary computing architecture and computer, this is presented merely to provide a useful reference in discussing various aspects of the invention. Of course, the description of the architecture has been simplified for purposes of discussion, and it is just one of many different types of architecture that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

As described above, the system 100 comprises a computer 102. The computer 102 may be a dedicated games console specifically manufactured for executing computer games, a personal computer system, a mainframe, a minicomputer, a server, a workstation, a notepad, a personal digital assistant, or a mobile telephone, or, indeed, any other computing platform suitable for executing embodiments of the invention.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of defining an animation of a virtual object within a virtual world, wherein the animation comprises performing, at each of a series of time points, an update that updates values for object attributes of the virtual object, the method comprising:

allowing a user to define the update by specifying, on a user interface, a structure representing the update, wherein the structure comprises a plurality of items and one or more connections between respective items, wherein each item represents a respective operation that may be performed when performing the update and wherein a connection between two items represents that data output by the operation represented by one of those two items is input to the operation represented by the other of those two items;

allowing the user to specify that the structure comprises one or more items in a predetermined category, the predetermined category being associated with a predetermined process such that an item belongs to the predetermined category if performing the respective operation represented by that item requires execution of the predetermined process, wherein said predetermined process may be executed at most a predetermined number of times at each time point; and applying one or more rules that (a) restrict how the user may specify the structure to ensure that performing the defined update does not require execution of the predetermined process more than the predetermined number of times, (b) do not require the user to specify that an item in the predetermined category is at a particular location within the structure relative to other items and (c) do not require the user to explicitly specify which operations need to be performed before execution of the predetermined process when performing the update nor which operations need to be performed after execution of the predetermined process when performing the update.

2. The method of claim 1, wherein the one or more rules restrict how the user may specify the structure to ensure that, when the predetermined process is executed, the predetermined process receives as input data at most one value for each object attribute.

3. The method of claim 2, wherein the one or more rules allow the user to specify the structure such that the data output by the operation represented by a first item may comprise a first value for a particular object attribute whilst the data output by the operation represented by a second item may comprise a second value, different from the first value, for that particular object attribute.

4. The method of claim 1, wherein the one or more rules restrict how the user may specify the structure to ensure that, when the predetermined process is executed, any data upon which the predetermined process operates is self-consistent.

5. The method of claim 1, wherein the one or more rules restrict how the user may specify the structure to ensure that, when the predetermined process is executed, the predetermined process does not receive as inputs a plurality of data values that represent a single data entity on which the predetermined process is to operate.

6. The method of claim 1, wherein:
the structure is a hierarchical state machine having one or more states, each of the one or more states comprising one or more of the items of the structure; and
the one or more rules specify that each of the one or more states may comprise at most one item in the predetermined category.

7. The method of claim 1, wherein:
the structure is a hierarchical state machine having one or more states, each of the one or more states comprising one or more of the items of the structure; and
the one or more rules specify that a state may only comprise a plurality of items in the predetermined category provided that the respective operations represented by those items in the predetermined category do not each operate on data comprising a respective value for a common object attribute.

8. The method of claim 1, wherein:
the structure may comprise a state machine having a plurality of states, each state comprising one or more of the items of the structure, wherein a first state and a second state both comprise one or more respective items in the predetermined category; and
the method comprises specifying that, for a transition from the first state to the second state during which both the first state and the second state are to process and output data, execution of the predetermined process by the respective operations represented by the one or more items in the predetermined category of the first state or of the second state is replaced by execution of an alternative process not involving the predetermined process.

9. The method of claim 8, wherein the alternative process is an approximation of the predetermined process.

10. The method of claim 1, wherein:
the structure is a hierarchical state machine having one or more states, each of the one or more states comprising one or more of the items of the structure; and
the one or more rules restrict how the user may specify the structure to ensure that, for each object attribute, only one state that operates on that object attribute may be active when performing the update.

11. The method of claim 1, comprising the user interface allowing the user to represent a plurality of items as a single item in the structure and to reveal or hide that plurality of items in response to a request from the user.

12. The method of claim 11, comprising the user interface allowing the user to specify that the structure comprises a compositor item, the compositor item being an item that (i) receives data comprising values for a plurality of object attributes;
(ii) outputs data comprising values for that same plurality of object attributes; and
(iii) represents a plurality of items in the structure, wherein the operation represented by one of that plurality of items operates on values for a subset of that plurality of object attributes and the operation represented by another one of that plurality of items operates on values for a different subset of that plurality of object attributes;
wherein the one or more rules specify that the plurality of items being represented by the compositor item may comprise a plurality of items in the predetermined category only if no two of these items in the predetermined category operate on a value for the same object attribute.

13. The method of claim 1, wherein the predetermined process is a simulation of the laws of physics acting on the virtual world.

14. The method of claim 1, wherein the predetermined process is a game character controller process.

15. The method of claim 1, in which the predetermined number of times is 1.

16. The method of claim 1, wherein specifying the structure comprises the user placing the items within the structure depicted on the user interface such that data comprising values for object attributes is represented as being passed between operations represented by items via the connections in a predetermined direction across the user interface.

17. The method of claim 16, wherein data representing time is represented as being passed between operations represented by items via the connections in a direction opposite to the predetermined direction.

18. The method of claim 1, wherein, for a connection between a first item and a second item that represents that data output by the operation represented by the first item is input to the operation represented by the second item, the user interface is arranged to depict the connection such that the connection is linked to the first item at a first predetermined location relative to the first item and is linked to the second item at a second predetermined location relative to the second item.

19. The method of claim 18, in which the first predetermined location is at a right side of the first item and the second predetermined location is at a left side of the second item.

20. The method of claim 18, wherein the user interface is arranged to represent that data representing time is passed, via the connection, as an output from the operation represented by the second item to be an input to the operation represented by the first item.

21. The method of claim 1, comprising providing a warning to the user when the user attempts to perform an action via the user interface that is contrary to the one or more rules.

22. The method of claim 21, comprising disallowing the action that is contrary to the one or more rules.

23. An animation design apparatus for defining an animation of a virtual object within a virtual world, wherein the animation comprises performing, at each of a series of time points, an update that updates values for object attributes of the virtual object, the apparatus comprising:
a display device for providing a visual output to a user;
a user input device for receiving an input from a user; and
a processor arranged to instruct the display device to display a user interface and to receive input from a user, via the user input device, representing the interaction of the user with the user interface;
wherein the processor is arranged to:
allow the user to define the update by specifying, on a user interface, a structure representing the update, wherein the structure comprises a plurality of items and one or more connections between respective items, wherein each item represents a respective operation that may be performed when performing the update and wherein a connection between two items represents that data output by the operation represented by one of those two items is input to the operation represented by the other of those two items;
allow the user to specify that the structure comprises one or more items in a predetermined category, the predetermined category being associated with a predetermined process such that an item belongs to the predetermined category if performing the respective operation represented by that item requires execution of the predetermined process, wherein said predetermined process may be executed at most a predetermined number of times at each time point; and apply one or more rules that (a) restrict how the user may specify the structure to ensure that performing the defined update does not require execution of the predetermined process more than the predetermined number of times, (b) do not require the user to specify that an item in the predetermined category is at a particular location within the structure relative to other items and (c) do not require the user to explicitly specify which operations need to be performed before execution of the predetermined process when performing the update nor which operations need to be performed after execution of the predetermined process when performing the update.

24. The apparatus of claim 23, wherein the one or more rules restrict how the user may specify the structure to ensure that, when the predetermined process is executed, the predetermined process receives as input data at most one value for each object attribute.

25. The apparatus of claim 24, wherein the one or more rules allow the user to specify the structure such that the data output by the operation represented by a first item may comprise a first value for a particular object attribute whilst the data output by the operation represented by a second item may comprise a second value, different from the first value, for that particular object attribute.

26. The apparatus of claim 23, wherein the one or more rules restrict how the user may specify the structure to ensure that, when the predetermined process is executed, any data upon which the predetermined process operates is self-consistent.

27. The apparatus of claim 23, wherein the one or more rules restrict how the user may specify the structure to ensure that, when the predetermined process is executed, the predetermined process does not receive as inputs a plurality of data values that represent a single data entity on which the predetermined process is to operate.

28. The apparatus of claim 23, wherein:
the structure is a state machine having one or more states, the or each state comprising one or more of the items of the structure; and
the one or more rules specify that the or each state may comprise at most one item in the predetermined category.

29. The apparatus of claim 23, wherein:
the structure is a state machine having one or more states, the or each state comprising one or more of the items of the structure; and
the one or more rules specify that a state may only comprise a plurality of items in the predetermined category provided that the respective operations represented by those items in the predetermined category do not each operate on data comprising a respective value for a common object attribute.

30. The apparatus of claim 23, wherein:
the structure may comprise a state machine having a plurality of states, each state comprising one or more of the items of the structure, wherein a first state and a second state both comprise one or more respective items in the predetermined category; and
the apparatus specifies that, for a transition from the first state to the second state during which both the first state and the second state are to process and output data, execution of the predetermined process by the respective operations represented by the one or more items in the predetermined category of the first state or of the second state is replaced by execution of an alternative process not involving the predetermined process.

31. The apparatus of claim 30, wherein the alternative process is an approximation of the predetermined process.

32. The apparatus of claim 23, wherein:
the structure is a state machine having one or more states, the or each state comprising one or more of the items of the structure; and
the one or more rules restrict how the user may specify the structure to ensure that, for each object attribute, only one state that operates on that object attribute may be active when performing the update.

33. The apparatus of claim 23, wherein the user interface allows the user to represent a plurality of items as a single item in the structure and to reveal or hide that plurality of items in response to a request from the user.

34. The apparatus of claim 33, wherein the user interface allows the user to specify that the structure comprises a compositor item, the compositor item being an item that (i) receives data comprising values for a plurality of object attributes; (ii) outputs data comprising values for that same plurality of object attributes; and (iii) represents a plurality of items in the structure, wherein the operation represented by one of that plurality of items operates on values for a subset of that plurality of object attributes and the operation represented by another one of that plurality of items operates on values for a different subset of that plurality of object attributes;
wherein the one or more rules specify that the plurality of items being represented by the compositor item may comprise a plurality of items in the predetermined category only if no two of these items in the predetermined category operate on a value for the same object attribute.

35. The apparatus of claim 23, wherein the predetermined process is a simulation of the laws of physics acting on the virtual world.

36. The apparatus of claim 23, wherein the predetermined process is a game character controller process.

37. The apparatus of claim 23, in which the predetermined number of times is 1.

38. The apparatus of claim 23, wherein specifying the structure comprises the user placing the items within the structure depicted on the user interface such that data comprising values for object attributes is represented as being passed between operations represented by items via the connections in a predetermined direction across the user interface.

39. The apparatus of claim 38, wherein data representing time is represented as being passed between operations represented by items via the connections in a direction opposite to the predetermined direction.

40. The apparatus of claim 23, wherein, for a connection between a first item and a second item that represents that data output by the operation represented by the first item is input to the operation represented by the second item, the user interface is arranged to depict the connection such that the connection is linked to the first item at a first predetermined location relative to the first item and is linked to the second item at a second predetermined location relative to the second item.

41. The apparatus of claim 40, in which the first predetermined location is at a right side of the first item and the second predetermined location is at a left side of the second item.

42. The apparatus of claim 40, wherein the user interface is arranged to represent that data representing time is passed, via the connection, as an output from the operation represented by the second item to be an input to the operation represented by the first item.

43. The apparatus of claim 23, wherein the processor is arranged to provide a warning to the user when the user attempts to perform an action via the user interface that is contrary to the one or more rules.

44. The apparatus of claim 43, wherein the processor is arranged to disallow the action that is contrary to the one or more rules.

45. A non-transitory computer readable medium storing a computer program for defining an animation of a virtual object within a virtual world, wherein the animation comprises performing, at each of a series of time points, an update that updates values for object attributes of the virtual object, wherein the computer program, when executed by a computer, carries out the steps of:

allowing a user to define the update by specifying, on a user interface, a structure representing the update, wherein the structure comprises a plurality of items and one or more connections between respective items, wherein each item represents a respective operation that may be performed when performing the update and wherein a connection between two items represents that data output by the operation represented by one of those two items is input to the operation represented by the other of those two items;

allowing the user to specify that the structure comprises one or more items in a predetermined category, the predetermined category being associated with a predetermined process such that an item belongs to the predetermined category if performing the respective operation represented by that item requires execution of the predetermined process, wherein said predetermined process may be executed at most a predetermined number of times at each time point; and applying one or more rules that (a) restrict how the user may specify the structure to ensure that performing the defined update does not require execution of the predetermined process more than the predetermined number of times, (b) do not require the user to specify that an item in the predetermined category is at a particular location within the structure relative to other items and (c) do not require the user to explicitly specify which operations need to be performed before execution of the predetermined process when performing the update nor which operations need to be performed after execution of the predetermined process when performing the update.

* * * * *